United States Patent
Hang et al.

(10) Patent No.: US 12,113,740 B2
(45) Date of Patent: Oct. 8, 2024

(54) COMMUNICATION METHOD AND COMMUNICATIONS APPARATUS

(71) Applicant: HUAWEI TECHNOLOGIES CO., LTD., Guangdong (CN)

(72) Inventors: Haicun Hang, Shanghai (CN); Liuliu Ji, Shanghai (CN); Hongzhe Shi, Shenzhen (CN); Xiaohan Wang, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 17/514,268

(22) Filed: Oct. 29, 2021

(65) Prior Publication Data
US 2022/0052819 A1    Feb. 17, 2022

Related U.S. Application Data

(63) Continuation of application No. PCT/CN2020/087893, filed on Apr. 29, 2020.

(30) Foreign Application Priority Data

Apr. 30, 2019    (CN) .......................... 201910365179.3

(51) Int. Cl.
*H04L 5/00*    (2006.01)
*H04W 72/0446*    (2023.01)
(Continued)

(52) U.S. Cl.
CPC ....... *H04L 5/0051* (2013.01); *H04W 72/0446* (2013.01); *H04W 72/0453* (2013.01); *H04W 72/23* (2023.01)

(58) Field of Classification Search
CPC ......... H04W 72/0453; H04W 72/0446; H04W 72/23; H04L 5/0051
(Continued)

(56) References Cited

U.S. PATENT DOCUMENTS

| | | | |
|---|---|---|---|
| 11,705,984 B2 * | 7/2023 | Lin | H04L 5/0051 370/329 |
| 2015/0180625 A1 | 6/2015 | Park et al. | |
| 2023/0291531 A1 * | 9/2023 | Kim | H04L 5/0035 370/329 |

FOREIGN PATENT DOCUMENTS

| | | |
|---|---|---|
| CN | 103037511 A | 4/2013 |
| CN | 109391413 A | 2/2019 |

(Continued)

OTHER PUBLICATIONS

Huawei et al., "Summary of AI: 7.2.8.2 Enhancements on Multi-TRP/Panel Transmission of Offline Discussion," 3GPP TSG RAN WG1 Meeting #96bis, R1-190abcd, Apr. 8-12, 2019, 27 pages.
(Continued)

*Primary Examiner* — Peter G Solinsky
(74) *Attorney, Agent, or Firm* — Fish & Richardson P.C.

(57) ABSTRACT

Example communication methods and communications apparatus are described. One example method include: receiving downlink control information (DCI), where the DCI indicates N demodulation reference signal (DMRS) ports. The N DMRS ports correspond to each of M physical downlink shared channel (PDSCH) transmission units, at least two of the M PDSCH transmission units correspond to different transmission configuration indicator (TCI)-states, N is an integer greater than or equal to 1, and M are integers greater than or equal to 2. M PDSCHs are received based on the DCI.

21 Claims, 6 Drawing Sheets

(51) Int. Cl.
*H04W 72/0453* (2023.01)
*H04W 72/23* (2023.01)

(58) Field of Classification Search
USPC .......................................................... 370/329
See application file for complete search history.

(56) References Cited

FOREIGN PATENT DOCUMENTS

| CN | 109392111 A | 2/2019 |
|---|---|---|
| CN | 110535590 A | 12/2019 |
| WO | 2018026241 A1 | 2/2018 |
| WO | 2019015587 A1 | 1/2019 |

OTHER PUBLICATIONS

Office Action in Chinese Appln. No. 201910365179.3, dated Jan. 12, 2023, 7 pages.

Office Action in Japanese Appln. No. 2021-564658, dated Dec. 20, 2022, 8 pages (with English translation).

Office Action issued in Chinese Application No. 201910365179.3 on Jun. 29, 2022, 7 pages.

Extended European Search Report issued in European Application No. 20798626.6 on May 6, 2022, 10 pages.

Huawei et al., "Enhancements on Multi-TRP/panel transmission," 3GPP TSG RAN WG1 Meeting #96bis, R1-1905523, Xi'an, China, Apr. 8-12, 2019, 22 pages.

Huawei et al., "Enhancements on multi-TRP/panel transmission," 3GPP TSG RAN WG1 Ad-Hoc Meeting 1901, R1-1900017, Taipei, Taiwan, Jan. 21-25, 2019, 15 pages.

Huawei et al., "Summary of AI:7.2.8.2 Enhancements on Multi-TRP/Panel Transmission of Offline Discussion," 3GPP TSG RAN WG1 Meeting #96bis, R1-190ABCD, Xi'an, China, Apr. 8-12, 2019, 59 pages.

3GPP TS 38.211 V15.5.0 (Mar. 2019), "3rd Generation Partnership Project; Technical Specification Group Radio Access Network; NR; Physical channels and modulation(Release 15)," Mar. 2019, 96 pages.

3GPP TS 38.212 V15.5.0 (Mar. 2019), "3rd Generation Partnership Project; Technical Specification Group Radio Access Network; NR; Multiplexing and channel coding(Release 15)," Mar. 2019, 101 pages.

3GPP TS 38.214 V15.5.0 (Mar. 2019), "3rd Generation Partnership Project; Technical Specification Group Radio Access Network; NR; Physical layer procedures for data(Release 15)," Mar. 2019, 103 pages.

Huawei, HiSilicon, "Enhancements on Multi-TRP/panel transmission," 3GPP TSG RAN WG1 Meeting #96, R1-1901567, Athens, Greece, Feb. 25-Mar. 1, 2019, 14 pages.

PCT International Search Report and Written Opinion issued in International Application No. PCT/CN2020/087893 on Jul. 7, 2020, 20 pages (with English translation).

Huawei et al., "Enhancements on Multi-TRP/panel transmission," 3GPP TSG RAN WG1 #97, R1-1906029, Reno, USA, May 13-17, 2019, 17 pages.

Office Action in Japanese Appln. No. 2021-564658, mailed on Nov. 7, 2023, 5 pages (with English translation).

\* cited by examiner

COMMUNICATION METHOD AND COMMUNICATIONS APPARATUS

CROSS-REFERENCE TO RELATED APPLICATIONS

This application is a continuation of International Application No. PCT/CN2020/087893, filed on Apr. 29, 2020, which claims priority to Chinese Patent Application No. 201910365179.3, filed on Apr. 30, 2019. The disclosures of the aforementioned applications are hereby incorporated by reference in their entireties.

TECHNICAL FIELD

This application relates to the wireless communications field, and more specifically, to a communication method and a communications apparatus.

BACKGROUND

With the rapid development of mobile communications, a fifth generation (5th Generation, 5G) communications system has higher requirements on a system capacity, an instantaneous peak rate, spectral efficiency, a cell edge user throughput, and latency. In a communication transmission process, many small-packet burst services are generated, for example, burst services such as ultra-reliable and low-latency communication (ultra-reliable and low latency communication, URLLC). The URLLC service is used as an example. Data of the URLLC service usually requires reliability of up to 99.999% within a specific time (for example, 1 ms). Therefore, a diversity scheme is usually used for data transmission.

To ensure data transmission reliability, some schemes are proposed, for example, schemes such as time division multiplexing (time division multiplexing, TDM), space division multiplexing (space division multiplexing, SDM), and frequency division multiplexing (frequency division multiplexing, FDM). The TDM is used as an example. To be specific, a same physical downlink shared channel (physical downlink shared channel, PDSCH) may be repeatedly sent in different time units, so that data transmission reliability can be improved.

When a plurality of PDSCHs need to be transmitted, how to determine a demodulation reference signal (demodulation reference signal, DMRS) used to demodulate the plurality of PDSCHs is a problem to be resolved.

SUMMARY

This application provides a communication method and a communications apparatus, to determine, when a plurality of PDSCHs are transmitted, a DMRS port corresponding to a DMRS used to demodulate each PDSCH, and further correctly demodulate the PDSCH.

According to a first aspect, a communication method is provided. The method may be performed by a terminal device, or may be performed by a chip or circuit configured in a terminal device. This is not limited in this application.

The method may include: receiving downlink control information DCI, where the DCI indicates N demodulation reference signal DMRS ports, the N DMRS ports correspond to M physical downlink shared channels PDSCHs, at least two of the M PDSCHs correspond to different DMRS ports, and N and M are integers greater than or equal to 2; and receiving the M PDSCHs based on the DCI.

According to the foregoing technical solution, the terminal device may determine, based on the N demodulation reference signal (demodulation reference signal, DMRS port) ports (DMRS port) indicated by the downlink control information (downlink control information, DCI), a DMRS port corresponding to a DMRS used to demodulate each PDSCH. The N DMRS ports indicated by the DCI may be used for the M PDSCHs. In other words, each PDSCH may correspond to one or more DMRS ports, and at least two of the M PDSCHs correspond to different DMRS ports. Therefore, the terminal device may determine the DMRS port corresponding to the DMRS used to demodulate each PDSCH, to further correctly demodulate the PDSCH and ensure communication performance.

With reference to the first aspect, in some implementations of the first aspect, the N DMRS ports are configured to determine a quantity of DMRS ports, the quantity of DMRS ports represents a quantity of DMRS ports corresponding to each PDSCH, and the quantity of DMRS ports is used to determine the DMRS port corresponding to each PDSCH.

According to the foregoing technical solution, the terminal device may determine, based on the quantity of DMRS ports, the DMRS port corresponding to the DMRS used to demodulate the PDSCH, and the quantity of DMRS ports may be determined based on N.

Optionally, the terminal device may determine, based on the quantity of DMRS ports and a preset sequence, the DMRS port corresponding to the DMRS used to demodulate the PDSCH. The preset sequence may be an ascending sequence of DMRS port IDs, a descending sequence of DMRS port IDs, a sequence of DMRS ports in a DMRS port table, or the like. The preset sequence is specifically described in the following embodiments.

Optionally, the terminal device may determine, based on the quantity of DMRS ports and a correspondence between a DMRS port and a PDSCH, the DMRS port corresponding to the DMRS used to demodulate the PDSCH.

With reference to the first aspect, in some implementations of the first aspect, there is a correspondence between the N DMRS ports and the M PDSCHs, and the correspondence is used to determine the DMRS port corresponding to each PDSCH.

According to the foregoing technical solution, the terminal device may determine, based on the correspondence between a DMRS port and a PDSCH, the DMRS port corresponding to the DMRS used to demodulate the PDSCH.

Optionally, the correspondence between a DMRS port and a PDSCH may be a direct correspondence or an indirect correspondence. Alternatively, the correspondence between a DMRS port and a PDSCH may be a correspondence existing in a form of a correspondence or in a form of an association. This is not limited, and is specifically described in the following embodiments.

With reference to the first aspect, in some implementations of the first aspect, a sequence of the N DMRS ports is used to determine the DMRS port corresponding to each PDSCH.

According to the foregoing technical solution, the terminal device may determine, based on the sequence of the DMRS ports, the DMRS port corresponding to the DMRS used to demodulate each PDSCH.

Optionally, the sequence of the DMRS ports may represent, for example, a sequence of the DMRS ports in a sequence table of the DMRS ports, a sequence of indicated DMRS ports, or a sequence of the DMRS port IDs.

With reference to the first aspect, in some implementations of the first aspect, indication information is received, where the indication information is used to determine the correspondence with reference to a preset rule.

According to the foregoing technical solution, the terminal device may determine the correspondence between a DMRS port and a PDSCH based on the indication information and the preset rule, and further determine the DMRS port corresponding to the DMRS used to demodulate each PDSCH.

Optionally, the indication information may be separate signaling, or may be carried in the DCI, and the indication information may be, for example, a value (value).

According to a second aspect, a communication method is provided. The method may be performed by a network device, or may be performed by a chip or circuit configured in a network device. This is not limited in this application.

The method may include: generating downlink control information DCI, where the DCI indicates N demodulation reference signal DMRS ports, the N DMRS ports correspond to M physical downlink shared channels PDSCHs, at least two of the M PDSCHs correspond to different DMRS ports, and N and M are integers greater than or equal to 2; and sending the DCI.

According to the foregoing technical solution, the network device may indicate the N DMRS ports to a terminal device by using the DCI. The N DMRS ports may be used for the M PDSCHs. In other words, each PDSCH may correspond to one or more DMRS ports, and at least two of the M PDSCHs correspond to different DMRS ports. Therefore, the terminal device may determine, based on an indication of the DCI, a DMRS port corresponding to a DMRS used to demodulate each PDSCH, to further correctly demodulate the PDSCH and ensure communication performance.

With reference to the second aspect, in some implementations of the second aspect, the N DMRS ports are configured to determine a quantity of DMRS ports, the quantity of DMRS ports represents a quantity of DMRS ports corresponding to each PDSCH, and the quantity of DMRS ports is used to determine the DMRS port corresponding to each PDSCH.

With reference to the second aspect, in some implementations of the second aspect, there is a correspondence between the N DMRS ports and the M PDSCHs, and the correspondence is used to determine the DMRS port corresponding to each PDSCH.

With reference to the second aspect, in some implementations of the second aspect, a sequence of the N DMRS ports is used to determine the DMRS port corresponding to each PDSCH.

According to a third aspect, a communication method is provided. The method may be performed by a terminal device, or may be performed by a chip or circuit configured in a terminal device. This is not limited in this application.

The method may include: receiving downlink control information DCI, where the DCI indicates N demodulation reference signal DMRS ports, the N DMRS ports correspond to each of M physical downlink shared channels PDSCHs, the N DMRS ports correspond to different TCI-states in at least two transmission units, N is an integer greater than or equal to 1, and M is an integer greater than or equal to 2; and receiving the M PDSCHs based on the DCI.

According to a fourth aspect, a communication method is provided. The method may be performed by a network device, or may be performed by a chip or circuit configured in a network device. This is not limited in this application.

The method may include: generating downlink control information DCI, where the DCI indicates N demodulation reference signal DMRS ports, the N DMRS ports correspond to each of M physical downlink shared channels PDSCHs, the N DMRS ports correspond to different TCI-states in at least two transmission units, N is an integer greater than or equal to 1, and M is an integer greater than or equal to 2; and sending the DCI.

According to the foregoing technical solution, the network device may indicate the N DMRS ports to a terminal device by using the DCI, and the terminal device may determine, based on the N DMRS ports indicated by the DCI, a DMRS port corresponding to a DMRS used to demodulate each PDSCH. The N DMRS ports indicated by the DCI may be used for the M PDSCHs, and each PDSCH corresponds to the N DMRS ports indicated by the DCI. In other words, because the M PDSCHs are transmitted in different transmission units, and DMRS ports corresponding to DMRSs used to demodulate all PDSCHs may be the same, the terminal device can quickly determine, based on an indication of the DCI, the DMRS port corresponding to the DMRS used to demodulate each PDSCH, to further correctly demodulate the PDSCH and ensure communication performance. In addition, the N DMRS ports correspond to different TCI-states in the at least two transmission units, that is, TCI-states of DMRSs used to demodulate at least two PDSCHs are different. Alternatively, it may be understood as that the TCI-states of the N DMRS ports indicated by the DCI are not completely the same in different transmission units.

With reference to the third aspect or the fourth aspect, in some implementations, a transmission unit configured to transmit the PDSCH is determined based on a starting position of the transmission unit, a length of the transmission unit, and an interval between neighboring transmission units.

Optionally, the transmission unit configured to transmit the PDSCH is determined based on at least one of the following: the starting position of the transmission unit, the length of the transmission unit, and the interval between the neighboring transmission units.

With reference to the third aspect or the fourth aspect, in some implementations, the interval between the neighboring transmission units includes a symbol length between an ending position of a first transmission unit and a starting position of a second transmission unit in the neighboring transmission units.

To be specific, for the first transmission unit and the second transmission unit that are neighboring to each other, if the first transmission unit is located before the second transmission unit, the interval between the neighboring transmission units may be, for example, the symbol length between the ending position of the first transmission unit and the starting position of the second transmission unit.

With reference to the third aspect or the fourth aspect, in some implementations, the DCI indicates a plurality of transmission configuration indicator TCI-states, and a sequence of the plurality of TCI-states is used to determine a TCI-state corresponding to the DMRS port in the transmission unit.

With reference to the third aspect or the fourth aspect, in some implementations, there is a correspondence between the transmission unit and the transmission configuration indicator TCI-state, and the correspondence is used to determine a TCI-state corresponding to the DMRS port in the transmission unit.

With reference to the third aspect or the fourth aspect, in some implementations, the TCI-state includes a plurality of TC substates, and that there is a correspondence between the transmission unit and the transmission configuration indicator TCI-state includes that there is a correspondence between the transmission unit and the TCI substates in the TCI-state.

With reference to the third aspect or the fourth aspect, in some implementations, the transmission unit includes a time domain unit and/or a frequency domain unit.

With reference to the third aspect or the fourth aspect, in some implementations, the time domain unit is a mini-slot mini-slot.

According to a fifth aspect, a communication method is provided. The method may be performed by a terminal device, or may be performed by a chip or circuit configured in a terminal device. This is not limited in this application.

The method may include: receiving indication information, where the indication information is used to indicate information about a first transmission unit, the information about the first transmission unit includes the following information: a starting position of the first transmission unit or an ending position of the first transmission unit, a transmission length of the first transmission unit, and a transmission interval, the transmission interval is an interval between the first transmission unit and a neighboring transmission unit, and the first transmission unit is any one of a plurality of transmission units or the $1^{st}$ transmission unit in a plurality of transmission units; and receiving a plurality of physical downlink shared channels PDSCHs in the plurality of transmission units.

According to a sixth aspect, a communication method is provided. The method may be performed by a network device, or may be performed by a chip or circuit configured in a network device. This is not limited in this application.

The method may include: generating indication information, where the indication information is used to indicate information about a first transmission unit, the information about the first transmission unit includes the following information: a starting position of the first transmission unit or an ending position of the first transmission unit, a transmission length of the first transmission unit, and a transmission interval, the transmission interval is an interval between the first transmission unit and a neighboring transmission unit, and the first transmission unit is any one of a plurality of transmission units or the $1^{st}$ transmission unit in a plurality of transmission units; and sending the indication information.

According to the foregoing technical solution, the network device may indicate information about a transmission unit to a terminal device; or it may be understood as that the network device may indicate, to a terminal device, information about a transmission resource for transmitting a PDSCH. For example, the information may include a starting position or an ending position of the transmission unit (or the transmission resource), a transmission length (or a length of the transmission resource), and a transmission interval. In this way, the terminal device may determine information about each transmission unit (or information about a transmission resource for transmitting each PDSCH) based on the indicated information. Correspondingly, the terminal device may determine the information about each transmission unit (or the information about the transmission resource for transmitting each PDSCH) based on the information about the transmission unit, which may alternatively be understood as the information about the transmission resource for transmitting a PDSCH. For example, the information may include the starting position or the ending position of the transmission unit (or the transmission resource), the transmission length (or the length of the transmission resource), and the transmission interval. In other words, the network device may not need to notify the terminal device of information about each of M transmission units, or the network device may not need to notify the terminal device of information about the transmission resource used to transmit M PDSCHs. In this way, not only communication can be ensured, but also signaling overheads can be reduced.

With reference to the fifth aspect or the sixth aspect, in some implementations, a position of a front-loaded demodulation reference signal DMRS and a position of an additional DMRS in the first transmission unit are determined based on the transmission length of the first transmission unit and the transmission interval; and/or the position of the additional DMRS in the first transmission unit is determined based on the transmission length of the first transmission unit and the transmission interval.

With reference to the fifth aspect or the sixth aspect, in some implementations, the first transmission unit is the $1^{st}$ transmission unit in a slot. A position of a front-loaded demodulation reference signal DMRS in an $(n+1)^{th}$ transmission unit is obtained based on any one of the following: $l_n=\mod(l_0+n*(L+\Delta), 14)$, $l_n=l_0+n*(L+\Delta)$, or $l_n=l_0+n*(L)$, where $l_0$ represents the initial symbol position of the front-loaded DMRS in the first transmission unit, l represents the initial symbol position of the front-loaded DMRS in the $(n+1)^{th}$ transmission unit, L is the transmission length of the first transmission unit, $\Delta$ is an interval between the first transmission unit and an ending position of the neighboring transmission unit, n is an integer greater than or equal to 0, and mod is a modulo function.

With reference to the fifth aspect or the sixth aspect, in some implementations, the first transmission unit is the $1^{st}$ transmission unit in a slot. A position of a front-loaded demodulation reference signal DMRS in an $(n+1)^{th}$ transmission unit is obtained based on any one of the following: $l_n=\mod(l_0+n*\Delta, 14)$, $l_n=l_0+n*\Delta$, or $l_n=l_0+n*(L)$, where $l_0$ represents the initial symbol position of the front-loaded DMRS in the first transmission unit, l represents the initial symbol position of the front-loaded DMRS in the $(n+1)^{th}$ transmission unit, L is the transmission length of the first transmission unit, A is an interval between the first transmission unit and a starting position of the neighboring transmission unit, n is an integer greater than or equal to 0, and mod is a modulo function.

With reference to the fifth aspect or the sixth aspect, in some implementations, the first transmission unit is the $1^{st}$ transmission unit in a slot. A position of an additional demodulation reference signal DMRS in an $(n+1)^{th}$ transmission unit is obtained based on any one of the following: $l_{ad-n}=\mod(l_{ad-0}+n*(L+\Delta), 14)$, $l_{ad-n}=l_{ad-0}+n*(L+\Delta)$, or $l_{ad-n}=l_{ad-0}+n*(L)$, where $l_{ad-0}$ represents the initial symbol position of the additional DMRS in the first transmission unit, $l_{ad-n}$ represents the initial symbol position of the additional DMRS in the $(n+1)^{th}$ transmission unit, L is the transmission length of the first transmission unit, $\Delta$ is an interval between the first transmission unit and an ending position of the neighboring transmission unit, n is an integer greater than or equal to 0, and mod is a modulo function.

With reference to the fifth aspect or the sixth aspect, in some implementations, the first transmission unit is the $1^{st}$ transmission unit in a slot. A position of an additional demodulation reference signal DMRS in an $(n+1)^{th}$ transmission unit is obtained based on any one of the following: $l_{ad-n}=\mathrm{mod}(l_{ad-0}+n*\Delta,14)$, $l_{ad-n}=l_{ad-0}+n*\Delta$, or $l_{ad-n}=l_{ad-0}+n*(L)$, where $l_{ad-0}$ represents the initial symbol position of the additional DMRS in the first transmission unit, $l_{ad-n}$ represents the initial symbol position of the additional DMRS in the $(n+1)^{th}$ transmission unit, L is the transmission length of the first transmission unit, $\Delta$ is an interval between the first transmission unit and a starting position of a neighboring transmission unit, n is an integer greater than or equal to 0, and mod is a modulo function.

With reference to the fifth aspect or the sixth aspect, in some implementations, the transmission unit includes a time domain unit and/or a frequency domain unit.

With reference to the fifth aspect or the sixth aspect, in some implementations, the time domain unit is a mini-slot mini-slot.

According to a seventh aspect, a communications apparatus is provided. The communications apparatus is configured to perform the method provided in the first aspect. Specifically, the communications apparatus may include a module configured to perform the method provided in the first aspect, the third aspect, or the fifth aspect.

According to an eighth aspect, a communications apparatus is provided. The communications apparatus is configured to perform the method provided in the second aspect, the fourth aspect, or the sixth aspect. Specifically, the communications apparatus may include a module configured to perform the method provided in the second aspect, the fourth aspect, or the sixth aspect.

According to a ninth aspect, a communications apparatus is provided, and includes a processor. The processor is coupled to a memory, and may be configured to execute an instruction in the memory to implement the method in any one of the first aspect, the third aspect, or the fifth aspect, or any possible implementation of the first aspect, the third aspect, or the fifth aspect. Optionally, the communications apparatus further includes the memory. Optionally, the communications apparatus further includes a communications interface, and the processor is coupled to the communications interface.

In an implementation, the communications apparatus is a terminal device. When the communications apparatus is a terminal device, the communications interface may be a transceiver or an input/output interface.

In another implementation, the communications apparatus is a chip configured in a terminal device. When the communications apparatus is a chip configured in a terminal device, the communications interface may be an input/output interface.

In another implementation, the communications apparatus is a chip or a chip system.

Optionally, the transceiver may be a transceiver circuit. Optionally, the input/output interface may be an input/output circuit.

According to a tenth aspect, a communications apparatus is provided, and includes a processor. The processor is coupled to a memory, and may be configured to execute an instruction in the memory to implement the method in any one of the second aspect, the fourth aspect, or the sixth aspect, or any possible implementation of the second aspect, the fourth aspect, or the sixth aspect. Optionally, the communications apparatus further includes the memory. Optionally, the communications apparatus further includes a communications interface, and the processor is coupled to the communications interface.

In an implementation, the communications apparatus is a network device. When the communications apparatus is a network device, the communications interface may be a transceiver or an input/output interface.

In another implementation, the communications apparatus is a chip configured in a network device. When the communications apparatus is a chip configured in a network device, the communications interface may be an input/output interface.

In another implementation, the communications apparatus is a chip or a chip system.

Optionally, the transceiver may be a transceiver circuit. Optionally, the input/output interface may be an input/output circuit.

According to an eleventh aspect, a computer-readable storage medium is provided. The computer-readable storage medium stores a computer program, and when the computer program is executed by a communications apparatus, the communications apparatus is enabled to implement the method in any one of the first aspect, the third aspect, or the fifth aspect, or any possible implementation of the first aspect, the third aspect, or the fifth aspect.

According to a twelfth aspect, a computer-readable storage medium is provided. The computer-readable storage medium stores a computer program, and when the computer program is executed by a communications apparatus, the communications apparatus is enabled to implement the method in any one of the second aspect, the fourth aspect, or the sixth aspect, or any possible implementation of the second aspect, the fourth aspect, or the sixth aspect.

According to a thirteenth aspect, a computer program product including an instruction is provided. When the instruction is executed by a computer, a communications apparatus is enabled to implement the method provided in the first aspect, the third aspect, or the fifth aspect.

According to a fourteenth aspect, a computer program product including an instruction is provided. When the instruction is executed by a computer, a communications apparatus is enabled to implement the method provided in the second aspect, the fourth aspect, or the sixth aspect.

According to a fifteenth aspect, a communications system is provided, and includes the foregoing network device and terminal device.

Based on the embodiments of this application, the terminal device may determine, based on the N DMRS ports indicated by the DCI, the DMRS port corresponding to the DMRS used to demodulate each PDSCH. The N DMRS ports indicated by the DCI may be used for the M PDSCHs. In other words, each PDSCH may correspond to one or more DMRS ports. In addition, at least two of the M PDSCHs correspond to different DMRS ports, or each of the M PDSCHs corresponds to a same DMRS port. In either case, the terminal device may determine the DMRS port corresponding to the DMRS used to demodulate each PDSCH, to further correctly demodulate the PDSCH and ensure the communication performance.

DESCRIPTION OF EMBODIMENTS

The following describes technical solutions of this application with reference to the accompanying drawings.

The technical solutions in the embodiments of this application may be applied to various communications systems, such as a global system for mobile communications (Global System of Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, and a fifth generation (5th Generation, 5G) system or new radio (New Radio, NR) system.

Figure 1:
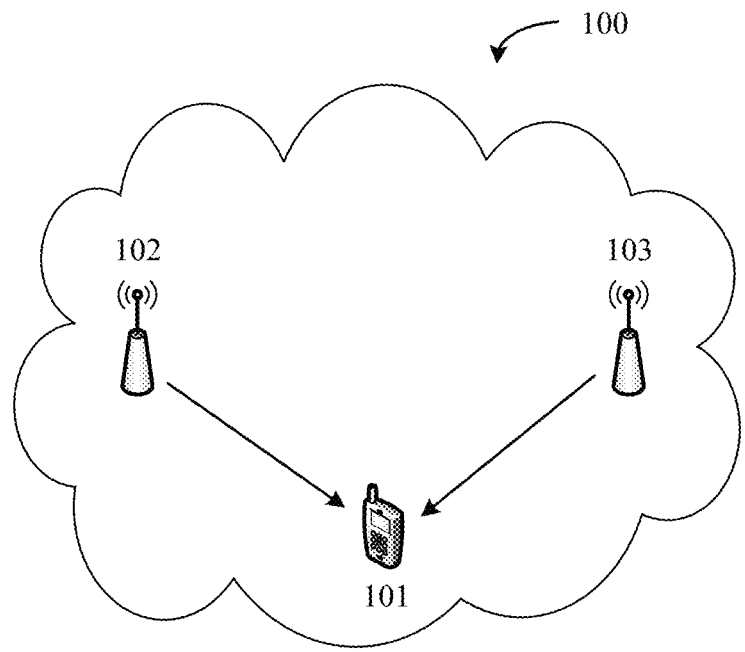
FIG. 1 is a schematic diagram of a communications system to which an embodiment of this application is applicable.

For ease of understanding of the embodiments of this application, a communications system shown in FIG. 1 is first used as an example to describe in detail a communications system to which a method provided in the embodiments of this application is applicable. FIG. 1 is a schematic diagram of a communications system 100 to which an embodiment of this application is applicable. As shown in the figure, the communications system 100 may include at least one terminal device, for example, a terminal device 101 shown in the figure. The communications system 100 may further include at least two network devices, for example, a network device #1 102 and a network device #2 103 shown in the figure. The network device #1 102 and the network device #2 103 may be network devices in a same cell. For example, the network device #1 102 and the network device #2 103 may be transmission and reception points (transmission and reception point, TRP) in a same cell; or may be network devices in different cells. This is not limited in this application. The figure is merely an example, and shows an example in which the network device #1 102 and the network device #2 103 are located in a same cell. It should be further understood that the embodiments of this application may further be applied to a scenario in which a multi-antenna panel of a network device is equivalent to a multi-TRP.

In the communications system 100, the network device #1 102 and the network device #2 103 may communicate with each other through a backhaul (backhaul) link. The backhaul link may be a wired backhaul link (for example, an optical fiber or a copper cable), or may be a wireless backhaul link (for example, a microwave). The network device #1 102 and the network device #2 103 may collaborate with each other to provide a service for the terminal device 101. Therefore, the terminal device 101 may separately communicate with the network device #1 102 and the network device #2 103 through a wireless link.

In addition, one or more of the network device #1 102 and the network device #2 103 may separately schedule a PDSCH for the terminal device 101 on one or more CCs by using a carrier aggregation technology. For example, the network device #1 102 may schedule the PDSCH for the terminal device 101 on a CC #1 and a CC #2, and the network device #2 103 may schedule the PDSCH for the terminal device 101 on the CC #1 and a CC #3. CCs on which the network device #1 102 and the network device #2 103 perform scheduling may be the same, or may be different. This is not limited in this application.

It should be understood that the communications system applied to the embodiments of this application is merely an example for description, and the communications system applicable to the embodiments of this application is not limited thereto.

A terminal device in the embodiments of this application may be a device that provides a user with voice/data connectivity, for example, a handheld device or vehicle-mounted device having a wireless connection function. Currently, some examples of the terminal device are: a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a wireless modem (modem), a handset (handset), a laptop computer (laptop computer), a machine type communication (machine type communication, MTC) terminal, a terminal device in a 5G network, a terminal device in a future evolved public land mobile network (public land mobile network, PLMN), and the like. This is not limited in the embodiments of this application.

A network device in the embodiments of this application may be a device configured to communicate with the terminal device. The network device may be a base transceiver station (Base Transceiver Station, BTS) in a global system for mobile communications (Global System of Mobile communication, GSM) or a code division multiple access (Code Division Multiple Access, CDMA) system, may be a NodeB (NodeB, NB) in a wideband code division multiple access (Wideband Code Division Multiple Access, WCDMA) system, may be an evolved NodeB (Evolutional NodeB, eNB or eNodeB) in an LTE system, or may be a radio controller in a cloud radio access network (Cloud Radio Access Network, CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In some deployments, the network device may include a centralized unit (centralized unit, CU) and a DU. The network device may further include an active antenna unit (active antenna unit, AAU for short). The CU implements some functions of the network device, and the DU implements some functions of the network device. For example, the CU is responsible for processing a non-real-time protocol and a non-real-time service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be a network device in an access network (radio access network, RAN), or may be a network device in a core network (core network, CN). This is not limited in this application.

For ease of understanding the embodiments of this application, several terms used in this application are first briefly described.

1. A demodulation reference signal is a reference signal that may be used for data demodulation. Based on different transmission directions, demodulation reference signals are classified into uplink demodulation reference signals and downlink demodulation reference signals. The demodulation reference signal may be a demodulation reference signal (demodulation reference signal, DMRS) in an LTE protocol or an NR protocol, or may be another reference signal that is defined in a future protocol and that is used to implement a same function. In the LTE or NR protocol, the DMRS may be carried on a physical shared channel and sent together with a data signal, to demodulate the data signal carried on the physical shared channel. For example, the DMRS is sent together with downlink data on a physical downlink shared channel (physical downlink share channel, PDSCH), or the DMRS is sent together with uplink data on a physical uplink shared channel (physical uplink share channel, PUSCH). In the embodiments of this application, the demodulation reference signal may include a downlink demodulation reference signal sent through a physical downlink shared channel.

Time domain mapping manners of the PDSCH or the PUSCH may include a first mapping manner and a second mapping manner. The first mapping manner may be a mapping type A in the NR protocol, and the second mapping manner may be a mapping type B in the NR protocol. Generally, the mapping manner of the PDSCH or the PUSCH may be indicated by using higher layer signaling, for example, radio resource control (RRC) signaling.

For the mapping type A, a time domain position of the demodulation reference signal is defined relative to a starting position of a slot, and the initial symbol position $l_0$ (that is, the initial symbol position of a front-loaded demodulation reference signal (front-loaded DMRS)) of a demodulation reference signal in a slot may be configured as the $3^{rd}$ symbol or the $4^{th}$ symbol in the slot, that is, $l_0=2$ or 3.

For the mapping type B, a time domain position of the demodulation reference signal is determined relative to a starting position of a resource of a scheduled physical uplink shared channel (or a physical downlink shared channel), and the initial symbol position $l_0$ (that is, the initial symbol position of a front-loaded demodulation reference signal) of a demodulation reference signal is the initial symbol of the scheduled physical uplink shared channel (or the physical downlink shared channel), that is $l_0=0$.

The demodulation reference signal may include a front-loaded demodulation reference signal and an additional demodulation reference signal.

The front-loaded demodulation reference signal may also be referred to as a first (first) demodulation reference signal, and occupies one or more symbols in time domain. If the front-loaded demodulation reference signal occupies a plurality of symbols, the plurality of symbols are consecutive in time domain.

For the additional (additional) demodulation reference signal, in a slot, a demodulation reference signal generated by using a same sequence after the front-loaded demodulation reference signal is an additional demodulation reference signal. The additional demodulation reference signal may be one or more symbols after the symbols occupied by the front-loaded demodulation reference signal, and the last symbol of the symbols occupied by the front-loaded demodulation reference signal is inconsecutive to the initial symbol of the symbols occupied by the additional demodulation reference signal. The additional demodulation reference signal may be used to configure a resource by using higher layer signaling, for example, RRC signaling. The additional demodulation reference signal is an optional demodulation reference signal.

2. A port is also referred to as an antenna port (antenna port). The antenna port may be understood as a transmit antenna identified by a receive end, or a transmit antenna that can be distinguished in space. Each virtual antenna may be configured with one antenna port, and each virtual antenna may be a weighted combination of a plurality of physical antennas. Antenna ports may be classified into a reference signal port and a data port based on different carried signals. The reference signal port includes but is not limited to a DMRS port, a zero power channel state information reference signal (channel state information reference signal, CSI-RS) trigger port, and the like.

In the embodiments of this application, the antenna port may be a DMRS port (DMRS port). DMRSs at different DMRS ports may occupy different time-frequency resources, or may occupy different orthogonal cover codes. When a network device indicates a port to a terminal device, the terminal device may receive a DMRS based on the port indicated by the network device, and demodulate a PDCCH or a PDSCH based on the received DMRS.

In addition, a parameter related to the antenna port may be a DMRS port, a DMRS port group (DMRS port group), or a DMRS code division multiplexing (code division multiplexing, CDM) group (DMRS CDM group). The terminal device may determine the DMRS port based on an antenna port indicated in DCI, and further determine a DMRS port group or a DMRS code division multiplexing group to which the DMRS port belongs.

It should be noted that the DMRS port group and the DMRS code division multiplexing group may be understood as being obtained by grouping DMRS ports in different manners. The antenna port, the DMRS port, the DMRS port group, and the DMRS code division multiplexing group may be distinguished by using indexes or identifiers, or may be distinguished by using other information that may be used to distinguish between different ports or different groups. This is not limited in this application.

In the following embodiments, the port and the DMRS port are sometimes used alternately. It should be understood that in the embodiments of this application, the port represents the DMRS port.

3. A slot is a minimum scheduling unit in terms of time in NR. A slot format is that 14 OFDM symbols are included, and a CP of each OFDM symbol is a normal CP (normal CP). A slot format is that 12 OFDM symbols are included, and a CP of each OFDM symbol is an extended CP (extended CP). A slot format is that 7 OFDM symbols are included, and a CP of each OFDM symbol is a normal CP. All OFDM symbols in one slot may be used for uplink transmission, or may be used for downlink transmission. Alternatively, a part of OFDM symbols in one slot may be used for downlink transmission, a part of OFDM symbols are used for uplink transmission, and a part of OFDM symbols are reserved for no transmission. It should be understood that the foregoing illustration is merely an example for description, and shall not constitute any limitation on this application. In consideration of system forward compatibility, the slot format is not limited to the foregoing examples.

4. A time-frequency resource: In the embodiments of this application, data or information may be carried on the time-frequency resource, and the time-frequency resource may include a time domain resource and a frequency domain resource. In time domain, the time-frequency resource may include one or more time domain units (which may also be referred to as time units). In frequency domain, the time-frequency resource may include a frequency domain unit.

A time domain unit (which may also be referred to as a time unit) may be one or more symbols, one mini-slot (mini-slot), one slot (slot), or one subframe (subframe). Duration of a subframe in time domain may be 1 millisecond (ms). One slot includes 7 or 14 symbols. One mini-slot may include at least one symbol (for example, 2 symbols, 7 symbols, or 14 symbols, or any quantity of symbols fewer than or equal to 14 symbols). The enumerated time domain unit sizes are merely intended to facilitate understanding of the solutions in this application, and should not be construed as a limitation on the present invention. It may be understood that the time domain unit sizes may be other values. This is not limited in this application.

One frequency domain unit may be one resource block (resource block, RB), one resource block group (resource block group, RBG), or one predefined subband (subband).

In the embodiments of this application, a transmission unit is mentioned for a plurality of times, and the transmission unit may include any one of the following: a time domain unit, a frequency domain unit, or a time-frequency unit. For example, the transmission unit mentioned in the embodiments of this application may be replaced with the time domain unit, the frequency domain unit, or the time-frequency unit.

5. Quasi-co-location (quasi-co-location, QCL) is also referred to as quasi-colocation. Signals corresponding to antenna ports that have a QCL relationship have a same parameter, and a parameter of one antenna port may be used to determine a parameter of another antenna port that has a QCL relationship with the antenna port, two antenna ports have a same parameter, or a parameter difference between two antenna ports is less than a threshold. The parameter may include one or more of the following: a delay spread (delay spread), a Doppler spread (Doppler spread), a Doppler shift (Doppler shift), an average delay (average delay), an average gain, and a spatial receive parameter (spatial Rx parameters). The spatial receive parameter may include one or more of the following: an angle of arrival (angle of arrival, AOA), an average AOA, an AOA spread, an angle of departure (angle of departure, AOD), an average angle of departure AOD, an AOD spread, a receive antenna spatial correlation parameter, a transmit antenna spatial correlation parameter, a transmit beam, a receive beam, and a resource identifier.

The foregoing angles may be decomposition values at different dimensions or a combination of decomposition values at different dimensions. The antenna ports are antenna ports having different antenna port numbers, antenna ports that have a same antenna port number and that are used to send or receive information at different times, on different frequencies, and/or on different code domain resources, and/or antenna ports that have different antenna port numbers and that are used to send or receive information at different times, on different frequencies, and/or on different code domain resources. The resource identifier may include: a CSI-RS resource identifier, an SRS resource identifier, an SSB resource identifier, a resource identifier of a preamble sequence transmitted on a physical random access channel (Physical Random Access Channel, PRACH), or a resource identifier of a DMRS; and is used to indicate a beam on a resource.

In the NR protocol, the QCL relationship may be classified into the following four types based on different parameters:

type A (type A): the Doppler shift, the Doppler spread, the average delay, and the delay spread;
  type B (type B): the Doppler shift and the Doppler spread;
  type C (type C): the Doppler shift and the average delay; and
  type D (type D): the spatial receive parameter.

6. A transmission configuration indicator (transmission configuration indicator, TCI) status may be used to indicate a QCL relationship between two types of reference signals. Each TCI-state may include a serving cell index (ServeCellIndex), a bandwidth part (bandwidth part, BWP) identifier (identifier, ID), and a reference signal resource identifier. The reference signal resource identifier may be, for example, at least one of the following: a non-zero power (non-zero power, NZP) CSI-RS reference signal resource identifier (NZP-CSI-RS-ResourceId), a non-zero power CSI-RS reference signal resource set identifier (NZP-CSI-RS-ResourceSetId), or an SSB index (SSB-Index).

In a communication process, the terminal device may determine a receive beam based on a TCI-state indicated by the network device, and the network device may determine a transmit beam based on the same TCI-state.

The TCI-state may be globally configured. In TCI-states configured for different cells and different BWPs, if indexes of the TCI-states are the same, configurations of the corresponding TCI-states are also the same.

Specifically, the network device may configure a TCI-state (TCI-state) list for the terminal device by using higher layer signaling (for example, an RRC message). The TCI-state list may include a plurality of TCI-states. For example, according to an existing protocol, a maximum of 128 TCI-states may be configured in a PDSCH configuration (PDSCH config).

Then, the network device may activate one or more TCI-states by using MAC CE signaling. The activated one or more TCI-states are a subset of the TCI-state list configured by using the RRC message. For example, the network device may activate a maximum of 8 TCI-states for each BWP in each cell. Then, the network device may further indicate a selected TCI-state by using a 3-bit (bit) field (for example, a TCI field) in physical layer signaling (for example, downlink control information (downlink control information, DCI)). The DCI may be, for example, DCI for scheduling a physical downlink resource (for example, a PDSCH).

Figure 2:
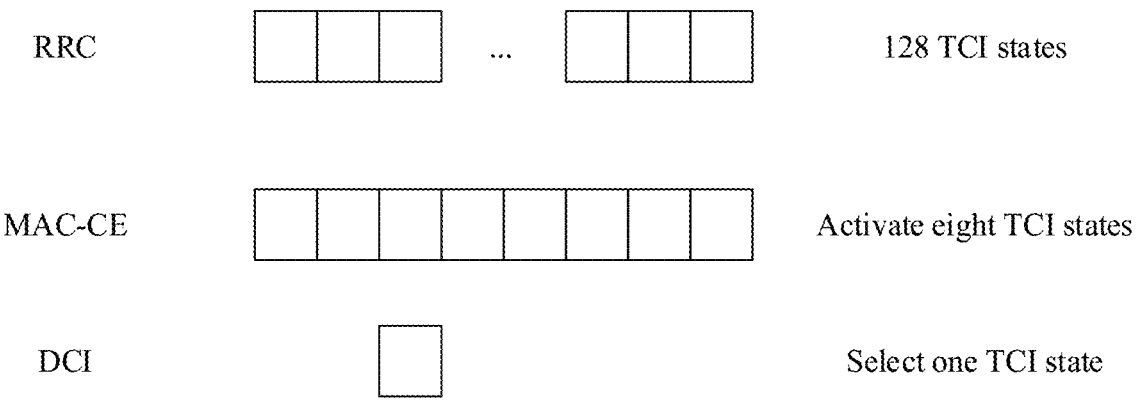
FIG. 2 is a schematic diagram of a TCI-state.

As shown in FIG. 2, the network device may configure 128 TCI-states for the terminal device by using RRC signaling, and the network device may further activate eight TCI-states for the terminal device by using a MAC-CE. The eight TCI-states are among the 128 TCI-states configured by the network device for the terminal device. The network device may further indicate a selected TCI-state by using the DCI.

7. Time division multiplexing (time division multiplexing, TDM): A same transport block is transmitted in different time units, and the time units may be, for example, mini-slots. When transmitted in the different time units, the same transport block may carry different redundancy version (redundancy version, RV) numbers, or transport blocks that carry one RV number may be separately placed in different time units.

With the rapid development of mobile communications, has higher requirements are proposed on a system capacity, an instantaneous peak rate, spectral efficiency, a cell edge user throughput, and latency. In a communication transmission process, many small-packet burst services are generated, for example, burst services such as ultra-reliable and low-latency communication (ultra-reliable and low latency communication, URLLC). The URLLC service is used as an example. Data of the URLLC service usually requires reliability of up to 99.999% within a specific time (for example, 1 ms). Therefore, a diversity scheme is usually used for data transmission.

To ensure reliability of data transmission, some solutions are proposed, for example, solutions such as TDM, space division multiplexing (space division multiplexing, SDM), and frequency division multiplexing (frequency division multiplexing, FDM).

Then, if a plurality of pieces of data need to be sent, how to determine a DMRS used to demodulate each piece of data?

In view of this, this application provides a communication method, to determine a DMRS port corresponding to a DMRS used to demodulate each piece of data.

The following describes in detail the embodiments provided in this application with reference to the accompanying drawings.

Figure 3:
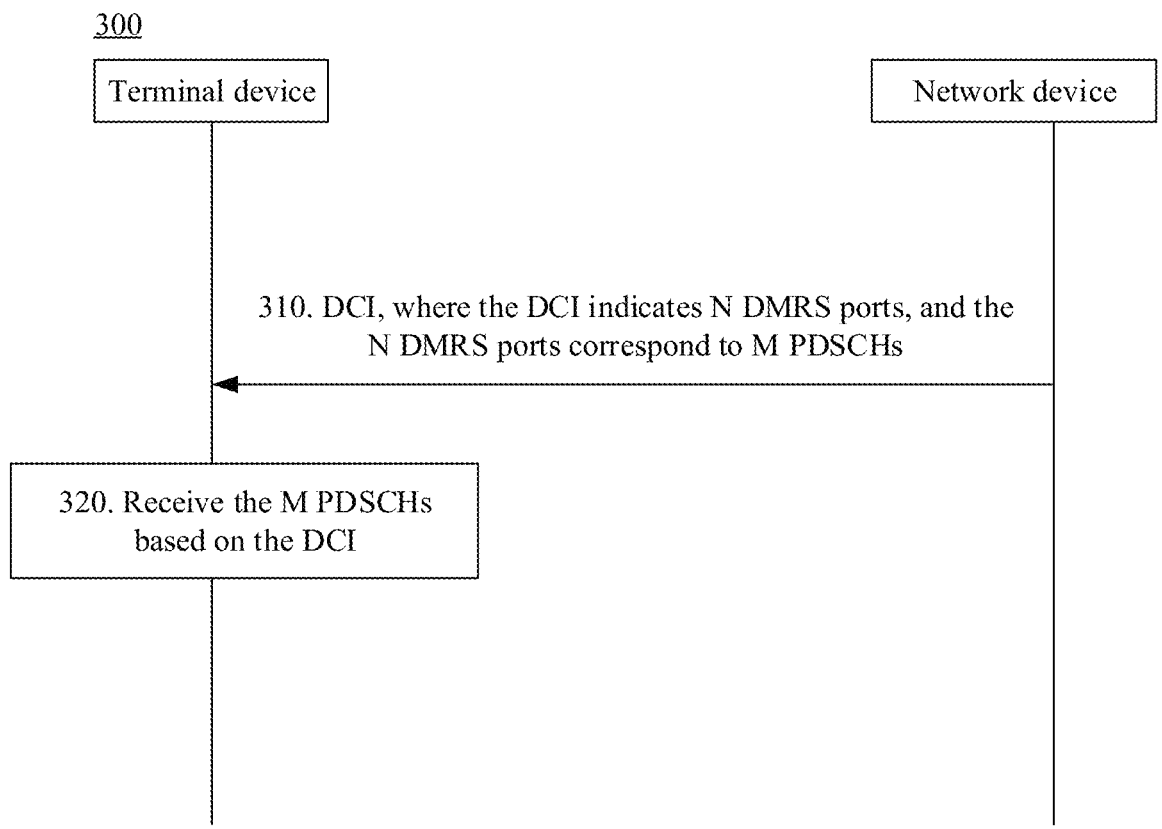
FIG. 3 is a schematic interaction diagram of a communication method according to an embodiment of this application.

FIG. 3 is a schematic interaction diagram of a communication method 300 from a perspective of device interaction according to an embodiment of this application. As shown in the figure, the method 300 may include the following steps.

310. A network device sends DCI to a terminal device, where the DCI indicates N DMRS ports, and the N DMRS ports correspond to M PDSCHs. Correspondingly, the terminal device receives the DCI.

In the embodiments of this application, that a DMRS port corresponds to a PDSCH or a DMRS port corresponding to a PDSCH is mentioned for a plurality of times. A person skilled in the art may understand meanings thereof. Both are used to indicate a port corresponding to a DMRS used to demodulate the PDSCH. It may also be understood that the terminal device receives the DMRS based on the DMRS port corresponding to the PDSCH, and demodulates the PDSCH based on the received DMRS.

For brevity, that the PDSCH corresponds to the DMRS port or that the DMRS port corresponds to the PDSCH is used for representation in the following descriptions.

That N DMRS ports correspond to M PDSCHs may include two cases.

Case A: At least two of the M PDSCHs correspond to different DMRS ports, where N and M are integers greater than or equal to 2.

For example, M=4 and N=2. For differentiation, the four PDSCHs are denoted as a PDSCH 1, a PDSCH 2, a PDSCH 3, and a PDSCH 4; and the two DMRS ports are denoted as a DMRS port 1 and a DMRS port 2.

It is assumed that the PDSCH 1 and the PDSCH 2 correspond to different DMRS ports. In this case, it indicates that a DMRS port corresponding to a DMRS used to demodulate the PDSCH 1 is different from a DMRS port corresponding to a DMRS used to demodulate the PDSCH 2. For example, the DMRS port corresponding to the DMRS used to demodulate the PDSCH 1 is the DMRS port 1, and the DMRS port corresponding to the DMRS used to demodulate the PDSCH 2 is the DMRS port 2. In other words, the DMRS received by the terminal device at the DMRS port 1 is used to demodulate the PDSCH 1, and the DMRS received by the terminal device at the DMRS port 2 is used to demodulate the PDSCH 2.

For another example, M=2 and N=4. For differentiation, the two PDSCHs are denoted as a PDSCH 1 and a PDSCH 2, and the four DMRS ports are denoted as a DMRS port 1, a DMRS port 2, a DMRS port 3, and a DMRS port 4.

It is assumed that the PDSCH 1 and the PDSCH 2 correspond to different DMRS ports. In this case, it indicates that a DMRS port corresponding to a DMRS used to demodulate the PDSCH 1 is different from a DMRS port corresponding to a DMRS used to demodulate the PDSCH 2. For example, DMRS ports corresponding to a DMRS used to demodulate the PDSCH 1 are the DMRS port 1 and the DMRS port 2, and DMRS ports corresponding to a DMRS used to demodulate the PDSCH 2 are the DMRS port 3 and the DMRS port 4. In other words, the DMRS received by the terminal device at the DMRS port 1 and the DMRS port 2 is used to demodulate the PDSCH 1, and the DMRS received by the terminal device at the DMRS port 3 and the DMRS port 4 is used to demodulate the PDSCH 2.

It should be understood that the foregoing descriptions are merely examples, and this application is not limited thereto. For example, each PDSCH may correspond to more DMRS ports.

Case B: The N DMRS ports correspond to each of the M PDSCHs, where N is an integer greater than or equal to 1, and M is an integer greater than or equal to 2.

Still, for example, M=4 and N=2. In the second case, DMRS ports corresponding to a DMRS used to demodulate a PDSCH 1, DMRS ports corresponding to a DMRS used to demodulate a PDSCH 2, DMRS ports corresponding to a DMRS used to demodulate a PDSCH 3, and DMRS ports corresponding to a DMRS used to demodulate a PDSCH 4 all include a DMRS port 1 and a DMRS port 2. In other words, the DMRS received by the terminal device based on the DMRS port 1 and the DMRS port 2 is used to demodulate the PDSCH 1, the PDSCH 2, the PDSCH 3, and the PDSCH 4. In other words, the DMRS ports indicated in the DCI are applied to all PDSCHs indicated in the DCI, and all the PDSCHs use a same DMRS port.

The foregoing two cases are described in detail below, and details are not described herein again.

320. The terminal device receives the M PDSCHs based on the DCI.

That the terminal device receives the M PDSCHs may also be understood as that the network device sends one piece of DCI, and the DCI indicates the M PDSCHs. For example, a plurality of TRPs may send the M PDSCHs. A TRP 1 and a TRP 2 are used as examples. For example, the TRP 1 sends M1 PDSCHs to the terminal device, and the TRP 2 sends M2 PDSCHs to the terminal device, where both M1 and M2 are integers greater than 1 or equal to 1, and M1+M2=M.

Optionally, the terminal device receives the PDSCHs in M transmission units.

Optionally, the transmission unit may include any one of the following: a time domain unit, a frequency domain unit, or a time-frequency unit. For example, the time domain unit includes a mini-slot, a symbol (symbol), a slot, or a sub-frame; the frequency domain unit includes a resource block, a resource block group, or a subband.

For ease of understanding, the following uses a mini-slot as an example for description.

The mini-slot is used as an example. The terminal device may receive PDSCHs in M mini-slots, and the terminal device receives M PDSCHs.

Optionally, the terminal device may determine M based on any one of the following solutions. In other words, the terminal device may determine the quantity M of repeated transmissions based on any one of the following solutions.

Solution 1: The quantity M of repeated transmissions is indicated by using a higher-layer parameter pdsch-AggregationFactor.

In an existing protocol, the pdsch-AggregationFactor is used to determine a quantity of repeated transmissions between slots. In this embodiment of this application, the pdsch-AggregationFactor may be reused, and the pdsch-AggregationFactor is used to indicate the quantity M of repeated transmissions (for example, a quantity of repeated transmissions in a mini-slot).

Solution 2: A parameter pdsch-AggregationFactor is additionally indicated, to indicate the quantity M of repeated transmissions.

For differentiation, the existing pdsch-AggregationFactor is denoted as a pdsch-AggregationFactor1, and the newly added pdsch-AggregationFactor is denoted as a pdsch-AggregationFactor2. The pdsch-AggregationFactor1 is used to determine a quantity of repeated transmissions between slots (which is an existing definition), and the pdsch-AggregationFactor2 is used to indicate a quantity of repeated transmissions in a slot.

The quantity M of repeated transmissions may be calculated based on the pdsch-AggregationFactor1 and the pdsch-AggregationFactor2. For example, if it is determined, based on the pdsch-AggregationFactor1, that the quantity of repetitions between slots is t1, and it is determined, based on the pdsch-AggregationFactor2, that the quantity of repetitions in a slot is t2, the quantity M of repeated transmissions is (t1*t2).

It should be understood that a name (for example, denoted as the pdsch-AggregationFactor 2 in the foregoing solution) of a parameter used to indicate the quantity of repeated transmissions in this solution is merely an example for description, and constitutes no limitation on the protection scope of the embodiments of this application.

Solution 3: The quantity M of repeated transmissions is indicated by using indication information.

For example, an X-bit field may be added to the DCI to indicate the quantity M of repeated transmissions, where X is an integer greater than or equal to 1. For example, this field may indicate a quantity of repeated transmissions in a slot, and a total quantity of repeated transmissions may be calculated based on this field and a pdsch-AggregationFactor in an existing protocol. For another example, this field may alternatively directly indicate the quantity of repeated transmissions.

It should be understood that the foregoing three solutions are merely examples, and the embodiments of this application are not limited thereto.

When a PDSCH mapping type is a type B and transmission duration of a mini-slot is two symbols, it is specified in the protocol that a PDSCH can be repeatedly transmitted for a maximum of four times in one slot. When transmission duration of a mini-slot is four symbols, it is specified in the protocol that a PDSCH can be repeatedly transmitted for a maximum of three times in one slot. When transmission duration of a mini-slot is six or seven symbols, it is specified in the protocol that a PDSCH can be repeatedly transmitted for a maximum of two times in one slot.

Optionally, the terminal device receives indication information, where the indication information indicates transmission information of any one of the M PDSCHs; and the terminal device may determine transmission information of the M PDSCHs based on the indication information.

The following describes in detail the case A and the case B in step 310.

In the following embodiments, a first transmission or a first transmission unit, and a second transmission or a second transmission unit are mentioned for a plurality of times, and a person skilled in the art should understand meanings thereof. For a TDM scheme, a starting symbol of a first transmission PDSCH is earlier than a starting symbol of a second transmission PDSCH, or an ending symbol of a first transmission PDSCH is earlier than an ending symbol of a second transmission PDSCH. For an FDM scheme, a starting frequency domain of a first transmission PDSCH is smaller than a starting frequency domain of a second transmission PDSCH. It should be understood that the first transmission or the first transmission unit is used as an example for description. A $Q^{th}$ transmission or a $Q^{th}$ transmission unit is similar, and details are not described herein again. Q is an integer greater than or equal to 1.

In step 310, that a network device indicates N DMRS ports to a terminal device by using DCI includes at least the following two possible implementations.

In a possible implementation, the network device may indicate a value (value) to the terminal device by using the DCI, for example, a value shown in Table 1. The terminal device may determine, based on the value, a DMRS port indicated by the DCI.

For example, it is assumed that a DMRS port table is shown in Table 1. When value=29 is selected, that is, the DCI indicates 29, the terminal device may determine that DMRS ports indicated by the DCI include a DMRS port 2, a DMRS port 3, a DMRS port 6, and a DMRS port 7. For another example, when value=27 is selected, that is, the DCI indicates 27, the terminal device may determine that DMRS ports indicated by the DCI include a DMRS port 2, a DMRS port 3, and a DMRS port 6.

It should be understood that Table 1 may be predefined, for example, pre-specified in a protocol or pre-configured by the network device. Table 1 may be pre-stored on a network device side and a terminal device side.

TABLE 1

| | One codeword (one codeword): codeword 0 enable (codeword 0 enable), and codeword 1 disabled (codeword 1 disable) | | | | Two codewords: codeword 0 enable (codeword 0 enable), and codeword 1 enable (codeword 1 enable) | | |
|---|---|---|---|---|---|---|---|
| Value | Quantity of DMRS code division multiplexing groups (excluding data) | DMRS port | Number of front-load symbols | Value | Quantity of DMRS code division multiplexing groups (excluding data) | DMRS port | Number of front-load symbols |
| 0 | 1 | 0 | 1 | 0 | 2 | 0 to 4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4 to 31 | Reserved | Reserved | Reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0 to 2 | 1 | | | | |
| 10 | 2 | 0 to 3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

It should be understood that the terminal device may determine the DMRS port in any one of the foregoing possible implementations.

The following describes two cases in detail.

Case A: At least two of the M PDSCHs correspond to different DMRS ports, where N and M are integers greater than or equal to 2.

For example, in this case, M may be less than N.

For example, the DMRS ports indicated by the DCI include a DMRS port 1, a DMRS port 2, a DMRS port 3, and a DMRS port 4, and M=2, that is, the PDSCH is repeatedly transmitted twice. In this case, the DMRS port 1 and the DMRS port 2 may be used for a first transmission PDSCH, and the DMRS port 3 and the DMRS port 4 may be used for a second transmission PDSCH.

For example, in this case, M may be equal to N.

For example, the DMRS ports indicated by the DCI include a DMRS port 1 and a DMRS port 2, and M=2, that is, the PDSCH is repeatedly transmitted twice. In this case, the DMRS port 1 may be used for a first transmission PDSCH, and the DMRS port 2 may be used for a second transmission PDSCH.

For example, in this case, M may be greater than N.

For example, the DMRS ports indicated by the DCI include a DMRS port 1 and a DMRS port 2, and M=4, that is, the PDSCH is repeatedly transmitted four times. In this case, the DMRS port 1 may be used for a first transmission PDSCH, the DMRS port 2 may be used for a second transmission PDSCH, the DMRS port 1 may be used for a third transmission PDSCH, and the DMRS port 2 may be used for a fourth transmission PDSCH.

It should be understood that there is no strict relationship between M and N in this case.

In this case, the terminal device may determine, in any one of the following manners, a DMRS port corresponding to each PDSCH, that is, determine a DMRS port corresponding to a DMRS used to demodulate each PDSCH.

Manner 1: The terminal device determines, based on a correspondence between a DMRS port and a PDSCH, the DMRS port corresponding to each PDSCH.

It should be understood that, in this embodiment of this application, the correspondence between a DMRS port and a PDSCH may also be understood as that the DMRS port is associated with or corresponding to the PDSCH, or may be understood as that there is a correspondence between a DMRS port corresponding to a DMRS used to demodulate a PDSCH and the PDSCH. A specific association or corresponding form is not limited. For example, a representation form of an association between a DMRS port and a PDSCH may be a form of a correspondence, a form of a table, or the like. This is not limited.

For ease of understanding, the association between a DMRS port and a PDSCH is represented by using a correspondence below.

Optionally, the terminal device may obtain the correspondence in any one of the following manners.

In an obtaining manner 1, the correspondence may be pre-stored, for example, pre-specified in a protocol or pre-configured by the network device. The terminal device may obtain the pre-stored correspondence.

In an obtaining manner 2, the correspondence may alternatively be indicated by the network device to the terminal device by using separate signaling. The terminal device may obtain the correspondence by receiving signaling that is delivered by the network device and that is used to indicate the correspondence.

For example, the network device indicates the correspondence to the terminal device by using higher layer signaling (for example, RRC signaling), and the terminal device determines the correspondence based on the higher layer signaling.

In an obtaining manner 3, the correspondence may alternatively be indicated by the network device to the terminal device by using DCI.

For example, the network device indicates a plurality of values (namely, a value 1 and a value 2) in a DMRS table to the terminal device by using the DCI. When two values are indicated in the DCI, it indicates that the DMRS on the PDSCH is determined based on the two values.

It should be understood that the three obtaining manners described above are merely examples for description, and the embodiments of this application are not limited thereto. Any manner in which the terminal device can obtain the correspondence shall fall within the protection scope of the embodiments of this application.

Optionally, the correspondence between a DMRS port and a PDSCH may be a direct correspondence, or may be an indirect correspondence. Manner 1 is specifically described below with reference to several forms.

Form 1: a correspondence between a TRP and a DMRS port

If a plurality of TRPs send PDSCHs to the terminal device, a DMRS port corresponding to each PDSCH may be determined based on a correspondence between an ID of a TRP and an ID of a DMRS port.

For example, a TRP 1 and a TRP 2 send PDSCHs to the terminal device. It is assumed that the DCI indicates four DMRS ports, and the four DMRS ports belong to different DMRS port groups (group). It is assumed that the four DMRS ports are a DMRS port 0, a DMRS port 1, a DMRS port 2, and a DMRS port 3, where the DMRS port 0 and the DMRS port 1 belong to a DMRS port group 1, and the DMRS port 2 and the DMRS port 3 belong to a DMRS port group 2.

In this case, the correspondence in the form 1 may be a correspondence shown in Table 2.

TABLE 2

| TRP | DMRS port group |
|---|---|
| TRP 1 | DMRS port group 1 |
| TRP 2 | DMRS port group 2 |

Therefore, it may be determined, based on the correspondence, that when the TRP 1 sends a PDSCH, a DMRS port in the DMRS port group 1 is used; and when the TRP 2 sends a PDSCH, a DMRS port in the DMRS port group 2 is used.

It should be understood that, for ease of understanding, an example in which the TRP 1 and the TRP 2 send the PDSCHs to the terminal device and the DCI indicates four DMRS ports is used for description above. The embodiments of this application are not limited thereto.

It should be further understood that the form 1 is merely an example for description, and the embodiments of this application are not limited thereto. For example, the form 1 may alternatively be a correspondence between a cell ID and a DMRS port.

Form 2: a correspondence between each transmission and a DMRS port

For example, the correspondence may be a correspondence between a quantity of repeated transmissions and a DMRS port.

For example, it is assumed that the PDSCH is repeatedly transmitted four times, and the DMRS ports indicated by the DCI include a DMRS port 1, a DMRS port 2, a DMRS port 3, and a DMRS port 4.

It should be understood that the quantity of repeated PDSCH transmissions and the indicated DMRS ports may be obtained in any one of the foregoing manners.

In this case, the correspondence in the form 2 may be a correspondence shown in Table 3.

TABLE 3

| Quantity of repeated transmissions | DMRS port ID |
|---|---|
| First transmission | DMRS port 1 and DMRS port 2 |
| Second transmission | DMRS port 3 and DMRS port 4 |
| Third transmission | DMRS port 1 and DMRS port 2 |
| Fourth transmission | DMRS port 3 and DMRS port 4 |

The terminal device may determine, with reference to Table 4, a DMRS port corresponding to the PDSCH based on a specific time for which the PDSCH is received.

For example, the correspondence may be a correspondence between a transmission unit and a DMRS port.

For example, it is assumed that there are four transmission units, and the DCI indicates a DMRS port 1, a DMRS port 2, a DMRS port 3, and a DMRS port 4.

In this case, the correspondence in the form 2 may be a correspondence shown in Table 4.

TABLE 4

| Transmission unit | DMRS port ID |
|---|---|
| First transmission unit | DMRS port 1 and DMRS port 2 |
| Second transmission unit | DMRS port 3 and DMRS port 4 |
| Third transmission unit | DMRS port 1 and DMRS port 2 |
| Fourth transmission unit | DMRS port 3 and DMRS port 4 |

The terminal device may determine, with reference to Table 4, a DMRS port corresponding to the PDSCH based on a specific transmission unit in which the PDSCH is received.

Form 3: a correspondence between a value, indicated by the DCI, in a DMRS table and a PDSCH For example, when there are two values, for example, a value 0 and a value 1 in sequence, a DMRS port corresponding to the value 0 is used for the first transmission PDSCH, and a DMRS port corresponding to the value 1 is used for the second transmission PDSCH. The value 0 and the value 1 are cyclically used: The DMRS port corresponding to the value 0 is used for the third transmission PDSCH, the DMRS port corresponding to the value 1 is used for the fourth transmission PDSCH, and so on.

For example, a DMRS port table in this form may be pre-specified, for example, pre-specified in a protocol or by the network device.

Form 4: a correspondence between a DMRS port group and a PDSCH

In actual scheduling, there may be a plurality of implementations. For example, a correspondence between a DMRS and a transmission PDSCH may be determined in a protocol.

In a possible implementation, a smaller (or larger) DMRS port group is always used for the first transmission PDSCH, and a DMRS corresponding to a subsequent transmission is sorted based on a DMRS port group in which the DMRS port group is located.

For example, it is assumed that the DMRS ports indicated by the DCI include a DMRS port 0, a DMRS port 1, a DMRS port 2, and a DMRS port 3, where the DMRS port 0 and the DMRS port 1 belong to a DMRS port group 1, and the port 2 and the port 3 belong to a DMRS port group 2; and the PDSCH is sent four times. In this case, the smaller DMRS port group 1 is always used for the first transmission PDSCH. Therefore, DMRS ports used for the first transmission PDSCH include the DMRS port 0 and the DMRS port 1, in other words, DMRS ports corresponding to PDSCHs received by the terminal device in the $1^{st}$ transmission unit include the DMRS port 0 and the DMRS port 1. The DMRS port group 2 is used for the second transmission PDSCH. Therefore, DMRS ports used for the second transmission PDSCH include the port 2 and the port 3. The DMRS port group 1 is used for the third transmission PDSCH. Therefore, DMRS ports used for the third transmission PDSCH include the port 0 and the port 1. The DMRS port group 2 is used for the fourth transmission PDSCH. Therefore, DMRS ports used for the fourth transmission PDSCH include the port 2 and the port 3.

In another possible implementation, a DMRS port group in which the 1st DMRS port is located may be used for the first transmission based on a DMRS port value indicated in the DCI. This is not limited in the embodiments of this application.

For example, it is assumed that the PDSCH is sent four times, and the DMRS port group in which the $1^{st}$ DMRS port is located is used for first transmission based on the DMRS port value indicated in the DCI. It is assumed that DMRS ports corresponding to values, indicated in the DCI, in the DMRS table are DMRS ports 0 to 3. If the $1^{st}$ DMRS port is the DMRS port 0 and a port group in which the DMRS port 0 is located is a DMRS port group 1, a port used for the first transmission PDSCH is a DMRS port belonging to the DMRS port group 1. If the $2^{nd}$ DMRS port indicated in the DCI is the DMRS port 1 and a port group in which the DMRS port 1 is located is the DMRS port group 1, the DMRS port 1 is skipped, that is, the DMRS port 1 is ignored. In other words, the $2^{nd}$ DMRS port indicated in the DCI is ignored. If the $3^{rd}$ port indicated in the DCI is the DMRS port 2 and a port group in which the DMRS port 2 is located is a DMRS port group 2, it indicates that a DMRS port used for the second transmission PDSCH belongs to the DMRS port group 2. If the $3^{rd}$ port indicated in the DCI is the DMRS port 2 and a port group in which the $4^{th}$ port is located is the DMRS port group 2, the DMRS port 3 is skipped, that is, the DMRS port 3 is ignored. In other words, the $4^{th}$ DMRS port indicated in the DCI is ignored. By analogy, the port used for the third transmission PDSCH is the same as the port used for the first transmission PDSCH, and the port used for the fourth transmission PDSCH is the same as the port used for the second transmission PDSCH.

It should be understood that the foregoing descriptions are merely examples, and the embodiments of this application are not limited thereto. For example, it may further be predefined in a protocol that a same DMRS port is used for the first M/2 transmission PDSCHs, and a same DMRS port is used for the last M−M/2 transmission PDSCHs. With reference to the foregoing correspondence between a DMRS port group and a transmission PDSCH, for example, it is assumed that a PDSCH is sent four times, and a smaller DMRS port group is always used for the first transmission PDSCH. In this case, a same DMRS port is used for the first M/2 transmission PDSCHs (that is, the first two transmission PDSCHs), in other words, a DMRS port group 1 is used; and a same DMRS port is used for the last two transmission PDSCHs, in other words, a DMRS port group 2 is used.

Form 5: a correspondence between each transmission and a DMRS port sequence

The correspondence in the form 5 may exist in a form of a default rule.

In a possible implementation, when only a single layer (single layer) is considered for repeated transmissions, a protocol or the network device predefines that the terminal device considers by default that the $1^{st}$ DMRS port is used for the first transmission PDSCH, the $2^{nd}$ DMRS port is used for the second transmission PDSCH, the $3^{rd}$ DMRS port is used for the third transmission PDSCH, the $4^{th}$ DMRS port is used for the fourth transmission PDSCH, and so on. If there is no $n^{th}$ DMRS port for an $n^{th}$ transmission PDSCH, calculation is performed from the beginning, to be specific, the $1^{st}$ DMRS port is used for the $n^{th}$ transmission PDSCH.

For example, it is assumed that M=4, and the DCI indicates a DMRS port 2 and a DMRS port 3. A sequence of the DMRS port 2 and the DMRS port 3 in the DMRS port table is: the DMRS port 2 and the DMRS port 3. In this case, the DMRS port 2 is used for the first transmission PDSCH, the DMRS port 3 is used for the second transmission PDSCH, the DMRS port 2 is used for the third transmission PDSCH, and the DMRS port 3 is used for the fourth transmission PDSCH.

In another possible implementation, each PDSCH corresponds to a plurality of DMRS ports.

In this implementation, the terminal device may first determine a quantity of DMRS ports corresponding to each PDSCH. After determining the quantity of DMRS ports corresponding to each PDSCH, the terminal device may determine, based on a sequence of DMRS ports corresponding to values indicated by the DCI in the DMRS port table, the DMRS ports corresponding to each PDSCH.

For example, it is assumed that M=4, and the DCI indicates a DMRS port 2, a DMRS port 3, a DMRS port 6, and a DMRS port 7. A sequence of the DMRS port 2, the DMRS port 3, the DMRS port 6, and the DMRS port 7 in the DMRS port table is: the DMRS port 2, the DMRS port 3, the DMRS port 6, and the DMRS port 7. In this case, the DMRS port 2 and the DMRS port 3 are used for the first transmission PDSCH, the DMRS port 6 and the DMRS port 7 are used for the second transmission PDSCH, the DMRS port 2 and the DMRS port 3 are used for the third transmission PDSCH, and the DMRS port 6 and the DMRS port 7 are used for the fourth transmission PDSCH.

It can be learned from the foregoing that the sequence of DMRS ports in the DMRS port table is related to repeated transmissions of the PDSCH.

For example, the DMRS port table and the DMRS port sequence in this form may be specified in a protocol.

For example, a row of DMRS ports, such as a DMRS port 0 and a DMRS port 2, are added. It is assumed that the DMRS port 0 and the DMRS port 2 in the DMRS port table is: the DMRS port 0 and the DMRS port 2, that is, a sequence of the DMRS port 0 and the DMRS port 2 in the DMRS port table is: the DMRS port 0 and the DMRS port 2. It is assumed that each PDSCH corresponds to one DMRS port. In this case, the DMRS port 0 is used for the first transmission PDSCH, the DMRS port 2 is used for the second transmission PDSCH, the DMRS port 0 is used for the third transmission PDSCH, and the DMRS port 2 is used for the fourth transmission PDSCH. The rest may be deduced by analogy.

For another example, a meaning of a sequence may also be given to a DMRS port in the DMRS port table. The value 29 is used as an example. A sequence of 2, 3, 6, and 7 indicates the sequence of using the DMRS ports. For example, it is assumed that each PDSCH corresponds to two DMRS ports, and the value is 29. It is assumed that M=4, each PDSCH corresponds to two DMRS ports, and the DCI indicates that the value is 29. In this case, the terminal device may determine that the first two DMRS ports, namely, the DMRS port 2 and the DMRS port 3, are used for the first transmission PDSCH; the latter two DMRS ports, namely, the DMRS port 6 and the DMRS port 7, are used for the second transmission PDSCH; the subsequent two DMRS ports, namely, the DMRS port 2 and the DMRS port 3, are used for the third transmission PDSCH; and the next two DMRS ports, namely, the DMRS port 6 and the DMRS port 7, are used for the fourth transmission PDSCH.

The foregoing describes a correspondence between a DMRS port and a PDSCH with reference to a plurality of forms. It should be understood that the embodiments of this application are not limited thereto. Any manner that can enable the terminal device to determine, based on the correspondence (a direct or indirect relationship) between a DMRS port and a PDSCH, a DMRS port corresponding to each PDSCH shall fall within the protection scope of the embodiments of this application.

Manner 2: The terminal device determines, based on the quantity of DMRS ports, the DMRS port corresponding to each PDSCH.

In this embodiment of this application, the quantity of DMRS ports is used to indicate a quantity of DMRS ports corresponding to each PDSCH. For example, if the PDSCH corresponds to a DMRS port 1 and a DMRS port 2, it indicates that the quantity of DMRS ports is 2. For another example, if the PDSCH corresponds to a DMRS port 1, a DMRS port 2, and a DMRS port 4, it indicates that the quantity of DMRS ports is 3.

Optionally, in this embodiment of this application, the terminal device may determine the quantity of DMRS ports in any one of the following possible implementations.

In a possible implementation, the network device sends indication information to the terminal device, where the indication information is used to indicate the quantity of DMRS ports.

The terminal device may determine the quantity of DMRS ports based on the indication information. The indication information may be, for example, separate signaling, or may be carried in the DCI used to indicate the N DMRS ports. This is not limited.

In another possible implementation, the terminal device may determine the quantity of DMRS ports based on a quantity of DMRS ports indicated by the DCI and a quantity of activated TCI-states.

For example, if the DCI indicates N DMRS ports, and the quantity of activated TCI-states is P1, the quantity of DMRS ports may be N/P1. P1 is an integer greater than or equal to 1.

There are many manners for indicating the N DMRS ports by the DCI. This is not limited in the embodiments of this application. For example, the DCI may directly indicate N. For another example, the DCI indicates a value, and the terminal device determines N based on the DMRS port table. For still another example, the DCI indicates N by using a higher-layer parameter.

The quantity of activated TCI-states may indicate a quantity of TRPs.

In another possible implementation, the terminal device may determine the quantity of DMRS ports based on a quantity of DMRS ports indicated by the DCI and a quantity of TRPs.

For example, if the terminal device determines that P2 TRPs send PDSCHs to the terminal device,
the DCI indicates N DMRS ports, and the quantity of TRPs is P2, the quantity of DMRS ports may be N/P2. P2 is an integer greater than or equal to 1, and generally, P2=P1.

In another possible implementation, it is stipulated in the protocol that only single-layer transmission is supported in repeated transmissions in a mini-slot, and each PDSCH corresponds to one DMRS port.

In another possible implementation, the DCI indicates a plurality of value values in the DMRS table, and a quantity of DMRS ports corresponding to each value is a quantity of DMRS ports on a PDSCH.

The terminal device may determine the quantity of DMRS ports in any one of the foregoing possible implementations.

After determining the quantity of DMRS ports, the terminal device may determine, in any one of the following implementations based on the DMRS ports indicated by the DCI, the DMRS port corresponding to each PDSCH.

Implementation 1: The DMRS port corresponding to each PDSCH may be determined with reference to a specific rule.

For example, DMRS ports may be used in a sequence of the DMRS ports in the DMRS port table by default.

The sequence of the DMRS port in the DMRS port table has been described above, and details are not described herein again.

It is assumed that DMRS ports corresponding to values, indicated by the DCI, in the DMRS port table are {DMRS port 4, DMRS port 1}, and M=4. The terminal device determines that the quantity of DMRS ports used for each transmission is 1. In this case, according to the DMRS port sequence in the DMRS port table, the terminal device determines that a DMRS port used for the first transmission PDSCH is the DMRS port 4, a DMRS port used for the second transmission PDSCH is the DMRS port 1, a DMRS port used for the third transmission PDSCH is the DMRS port 4, and a DMRS port used for the fourth transmission PDSCH is the DMRS port 1.

Implementation 2: The DMRS port corresponding to each PDSCH is determined based on a quantity of DMRS ports and a correspondence.

After determining the quantity of DMRS ports, the terminal device may determine, based on any correspondence in the manner 1, a DMRS port corresponding to each PDSCH.

The form 5 in the manner 1 is used as an example.

It is assumed that DMRS ports corresponding to values, indicated by the DCI, in the DMRS port table are {DMRS port 2, DMRS port 3, DMRS port 6, DMRS port 7}, and M=4. The terminal device determines that the quantity of DMRS ports used for each transmission is 2. In this case, according to the DMRS port sequence in the DMRS port table, the terminal device may determine that the DMRS port 2 and the DMRS port 3 are used for the first transmission PDSCH, the DMRS port 6 and the DMRS port 7 are used for the second transmission PDSCH, the DMRS port 2 and the DMRS port 3 are used for the third transmission PDSCH, and the DMRS port 6 and the DMRS port 7 are used for the fourth transmission PDSCH.

It should be understood that the foregoing implementation 2 may be used in combination with any correspondence in the manner 1, and details are not described herein.

Implementation 3: If the DCI indicates x values in the DMRS table, a DMRS port corresponding to the $1^{st}$ value is used for first transmission, a DMRS port corresponding to the $2^{nd}$ value is used for second transmission, the DMRS port corresponding to the $1^{st}$ value is used for third transmission, the DMRS port corresponding to the $2^{nd}$ value is used for fourth transmission, and so on.

The case A has been described in detail above, and a case B is described below.

Case B: The N DMRS ports correspond to each of the M PDSCHs, where N is an integer greater than or equal to 1, and M is an integer greater than or equal to 2.

In this case, the N DMRS ports indicated by the DCI are used for each PDSCH, or it may be understood as that the N DMRS ports indicated by the DCI are used for each transmission, or it may be understood as that DMRS ports corresponding to DMRSs used to demodulate all PDSCHs are the same, and all the DMRS ports are the N DMRS ports indicated by the DCI.

For example, if the DCI indicates a DMRS port 6 and a DMRS port 7, and M=4, DMRS ports used for the first transmission PDSCH include the DMRS port 6 and the DMRS port 7, DMRS ports used for the second transmission PDSCH include the DMRS port 6 and the DMRS port 7, DMRS ports used for the third transmission PDSCH include the DMRS port 6 and the DMRS port 7, and DMRS ports used for the fourth transmission PDSCH include the DMRS port 6 and the DMRS port.

For example, the transmission unit is a time domain unit, and it is assumed that a plurality of TRPs send PDSCHs to the terminal device. In this case, the PDSCHs are sent in a time division manner. Therefore, the plurality of TRPs may use a same DMRS port in different time periods. In other words, the DMRS ports indicated in the DCI may be used to indicate ports corresponding to all PDSCHs.

For example, the transmission unit is a frequency domain unit, and it is assumed that a plurality of TRPs send PDSCHs to the terminal device. In this case, the PDSCHs are sent in a frequency division manner. Therefore, the plurality of TRPs may use a same DMRS port on different frequency bands. In other words, the DMRS ports indicated in the DCI may be used to indicate ports corresponding to all PDSCHs.

For example, the transmission unit is a time-frequency unit, and it is assumed that a plurality of TRPs send PDSCHs to the terminal device. In this case, the plurality of TRPs may use a same DMRS port on different time-frequency resources. In other words, the DMRS ports indicated in the DCI may be used to indicate ports corresponding to all PDSCHs.

In this case, the N DMRS ports correspond to different TCI-states in at least two transmission units.

For ease of understanding, descriptions are provided with reference to four schemes for activating a TCI-state.

Activation Scheme 1

The network device may configure one or more TCI-state-pairs (TCI-state-pair) for the terminal device by using higher layer signaling (for example, an RRC message), and each TCI-state-pair includes a plurality of TCI-states (for example, two TCI-states). For example, a plurality of TCI-state-pairs are configured in a PDSCH config, the network device may activate one or more TCI-state-pairs by using a MAC CE, where the activated TCI-state-pair belongs to the configured TCI-state-pairs.

It is assumed that the DCI selects one TCI-state-pair from the activated TCI-state-pairs, and it may also be understood as that the DCI selects a plurality of TCI-states.

After the plurality of TCI-states are selected, different transmissions need to be mapped. Therefore, an indicated TCI-state may be specified.

For example, a sequence of configured TCI-state-pairs, for example, TCI-state-pairs configured in, for example, RRC signaling, namely, the PDSCH config, needs to be noted.

In a possible implementation, when the TCI-state-pairs indicated by the DCI include {TCI-state 1, TCI-state 2}, it may be considered by default that the first transmission PDSCH corresponds to the TCI-state 1, the second transmission PDSCH corresponds to the TCI-state 2, the third transmission PDSCH corresponds to the TCI-state 1, the fourth transmission PDSCH corresponds to the TCI-state 2, and so on.

It is assumed that M=4, as shown in Table 5.

TABLE 5

| | DCI indicates {TCI-state 1, TCI-state 2} | | | |
|---|---|---|---|---|
| | TRP 1 | TRP 2 | TRP 1 | TRP 2 |
| $n^{th}$ transmission PDSCH | First transmission PDSCH | Second transmission PDSCH | Third transmission PDSCH | Fourth transmission PDSCH |
| TCI-state | TCI-state 1 | TCI-state 2 | TCI-state 1 | TCI-state 2 |

It can be learned from the table that, for example, a TCI-state corresponding to the first transmission PDSCH is the TCI-state 1, that is, a TCI-state of a DMRS used to demodulate the first transmission PDSCH is the TCI-state 1; a TCI-state corresponding to the second transmission PDSCH is the TCI-state 2, that is, a TCI-state of a DMRS used to demodulate the second transmission PDSCH is the TCI-state 2; a TCI-state corresponding to the third transmission PDSCH is the TCI-state 1, that is, a TCI-state of a DMRS used to demodulate the third transmission PDSCH is the TCI-state 1; and a TCI-state corresponding to the fourth transmission PDSCH is the TCI-state 2, that is, a TCI-state of a DMRS used to demodulate the fourth transmission PDSCH is the TCI-state 2.

In another possible implementation, when the TCI-state-pairs indicated by the DCI include {TCI-state 1, TCI-state 2, . . . , TCI-state L}, and a quantity of TCI-states is L (where L is an integer greater than or equal to 2), the first M/L transmission PDSCHs correspond to the TCI-state 1, an $(M/L+1)^{th}$ transmission PDSCH to a $(2*M/L)^{th}$ transmission PDSCH correspond to the TCI-state 2, . . . , and an $(M-(L-1)*M/L)^{th}$ transmission PDSCH to an $M^{th}$ transmission PDSCH correspond to the TCI-state L.

It is assumed that M=4 and L=2, as shown in Table 6.

TABLE 6

| | DCI indicates {TCI-state 1, TCI-state 2} | | | |
|---|---|---|---|---|
| | TRP 1 | TRP 2 | TRP 1 | TRP 2 |
| $n^{th}$ transmission PDSCH | First transmission PDSCH | Second transmission PDSCH | Third transmission PDSCH | Fourth transmission PDSCH |
| TCI-state | TCI-state 1 | TCI-state 1 | TCI-state 2 | TCI-state 2 |

It can be learned from the table that, for example, a TCI-state corresponding to the first transmission PDSCH is the TCI-state 1, that is, a TCI-state of a DMRS used to demodulate the first transmission PDSCH is the TCI-state 1; a TCI-state corresponding to the second transmission PDSCH is the TCI-state 1, that is, a TCI-state of a DMRS used to demodulate the second transmission PDSCH is the TCI-state 1; a TCI-state corresponding to the third transmission PDSCH is the TCI-state 2, that is, a TCI-state of a DMRS used to demodulate the third transmission PDSCH is the TCI-state 2; and a TCI-state corresponding to the fourth transmission PDSCH is the TCI-state 2, that is, a TCI-state of a DMRS used to demodulate the fourth transmission PDSCH is the TCI-state 2.

Activation Scheme 2

The network device may configure one or more TCI-states for the terminal device by using higher layer signaling (for example, an RRC message), and the network device may maintain a table by using a MAC CE. For example, there is a corresponding table in the MAC CE, the table may correspond to a plurality of elements, and each element may include a plurality of TCI-states. In other words, to implement a scheme in which a plurality of TCI-states are included in a subsequent transmission, the network device may activate a plurality of TCI-states by using L2 signaling (for example, the MAC CE). For example, a plurality of elements that may be activated by the MAC CE are added to signaling (for example, the MAC CE), and one of the elements includes a plurality of TCI-states. That is, a plurality of TCI-states are activated by activating a plurality of elements.

It is assumed that a plurality of elements are activated, and each element includes a plurality of TCI-States, for example, a TCI-state 1 and a TCI-state 2. A bitmap (bitmap) is used to indicate that the MAC-CE activates a TCI-state, and each bitmap indicates that one element is activated.

For example, a sequence needs to be noted.

This scheme is similar to the activation scheme 1. The following provides a brief description. For details, refer to the descriptions in the activation scheme 1.

In a possible implementation, for example, when the plurality of TCI-states activated by using the activation scheme 2 include a TCI-state 1 and a TCI-state 2, it may be considered by default that the first transmission PDSCH corresponds to the TCI-state 1, the second transmission PDSCH corresponds to the TCI-state 2, the third transmission PDSCH corresponds to the TCI-state 1, the fourth transmission PDSCH corresponds to the TCI-state 2, and so on.

In another possible implementation, for example, when the plurality of TCI-states activated by using the activation scheme 2 include L TCI-states, it may be considered by default that the first M/L transmission PDSCHs correspond to a TCI-state 1, an $(M/L+1)^{th}$ transmission PDSCH to a $(2*M/L)^{th}$ transmission PDSCH correspond to a TCI-state 2, ..., and an $(M-(L-1)*M/L)^{th}$ transmission PDSCH to an $M^{th}$ transmission PDSCH correspond to a TCI-state L.

Activation Scheme 3

Y bits are added to the DCI, and the added Y bits may be used to select a plurality of activated TCI-states and the like, where Y is an integer greater than 1 or equal to 1. This scheme is not limited in this application.

For example, a sequence of the TCI-states in the DCI should be noted.

This scheme is similar to the activation scheme 1. The following provides a brief description. For details, refer to the description in the activation scheme 1.

In a possible implementation, for example, when a plurality of TCI-states activated by using the activation scheme 3 include a TCI-state 1 and a TCI-state 2, it may be considered by default that the first transmission PDSCH corresponds to the TCI-state 1, the second transmission PDSCH corresponds to the TCI-state 2, the third transmission PDSCH corresponds to the TCI-state 1, the fourth transmission PDSCH corresponds to the TCI-state 2, and so on.

In another possible implementation, for example, when a plurality of TCI-states activated by using the activation scheme 3 include L TCI-states, it may be considered by default that the first M/L transmission PDSCHs correspond to a TCI-state 1, an $(M/L+1)^{th}$ transmission PDSCH to a $(2*M/L)^{th}$ transmission PDSCH correspond to a TCI-state 2, ..., and an $(M-(L-1)*M/L)^{th}$ transmission PDSCH to an $M^{th}$ transmission PDSCH correspond to a TCI-state L.

In this case, a same DMRS port is used for each time of PDSCH transmission. It can be learned from the example shown in Table 5 that, for example, TCI-states of the first transmission PDSCH and the second transmission PDSCH are different. In other words, TCI-states of the DMRS ports in the first transmission unit and the second transmission unit are different. That is, the N DMRS ports correspond to different TCI-states in at least two transmission units.

Activation Scheme 4

For example, a time domain characteristic is added to a TCI-state defined in RRC signaling. For example, one TCI-state parameter includes two sub-states (sub-state), which are denoted as TCI sub-states. If the first n symbols are in a TCI sub-state 1, and the last m symbols are in a TCI sub-state 2, when a PDSCH is transmitted, it is determined, based on a symbol in which the PDSCH is located, whether a TCI-state of a DMRS corresponding to the PDSCH is the TCI sub-state 1 or the TCI-sub-state 2. For example, if the first transmission PDSCH is in the first n symbols, a TCI-state of a DMRS corresponding to the first transmission PDSCH is the TCI sub-state 1; if the first transmission PDSCH is in the last m symbols, a TCI-state of a DMRS corresponding to the first transmission PDSCH is the TCI sub-state 2. The case for the second transmission PDSCH or the like may be deduced by analogy.

It should be understood that the foregoing descriptions are merely examples. For example, a frequency domain characteristic may also be added to the TCI-state defined in the RRC signaling. For another example, a time-frequency characteristic may also be added to the TCI-state defined in the RRC signaling. This is not strictly limited.

It should be further understood that the foregoing plurality of activation schemes are merely examples, and the embodiments of this application are not limited thereto. Any variation of the foregoing schemes shall fall within the protection scope of the embodiments of this application. For example, when a quantity of TCI-states activated by using any one of the activation scheme 1, the activation scheme 2, or the activation scheme 3 is greater than or equal to a quantity of transmission PDSCHs, a TCI-state used for each transmission is sequentially determined. For example, {TCI-state 1, TCI-state 2, . . . , TCI-state L} are activated by using any one of the activation scheme 1, the activation scheme 2, or the activation scheme 3. It is assumed that M=2 and L=3. In this case, the first transmission PDSCH corresponds to the TCI-state 1, and the second transmission PDSCH corresponds to the TCI-state 2.

It should be further understood that in the foregoing embodiment, the PDSCH is used as an example for description. However, this constitutes no limitation on this application, and the PDSCH may alternatively be replaced with data.

Based on the foregoing technical solutions, in some scenarios, for example, in a scenario in which data (for example, a PDSCH) needs to be repeatedly sent, that is, in a scenario in which the terminal device receives a plurality of pieces of data, the network device may indicate a plurality of DMRS ports to the terminal device by using DCI. The plurality of DMRS ports are used for the plurality of pieces of data, and DMRS ports corresponding to the plurality of pieces of data may be all the same or may be partially the same. For example, at least two pieces of data in the plurality of pieces of data correspond to different DMRS ports. According to the DCI indication, the terminal device not only can accurately determine a DMRS port, but also can receive a DMRS based on the DMRS port, and further demodulate, by using the received DMRS, data corresponding to the DMRS, thereby ensuring data transmission performance.

With reference to FIG. 4 to FIG. 8, the following describes in detail information about a resource for transmitting each PDSCH.

Figure 4:
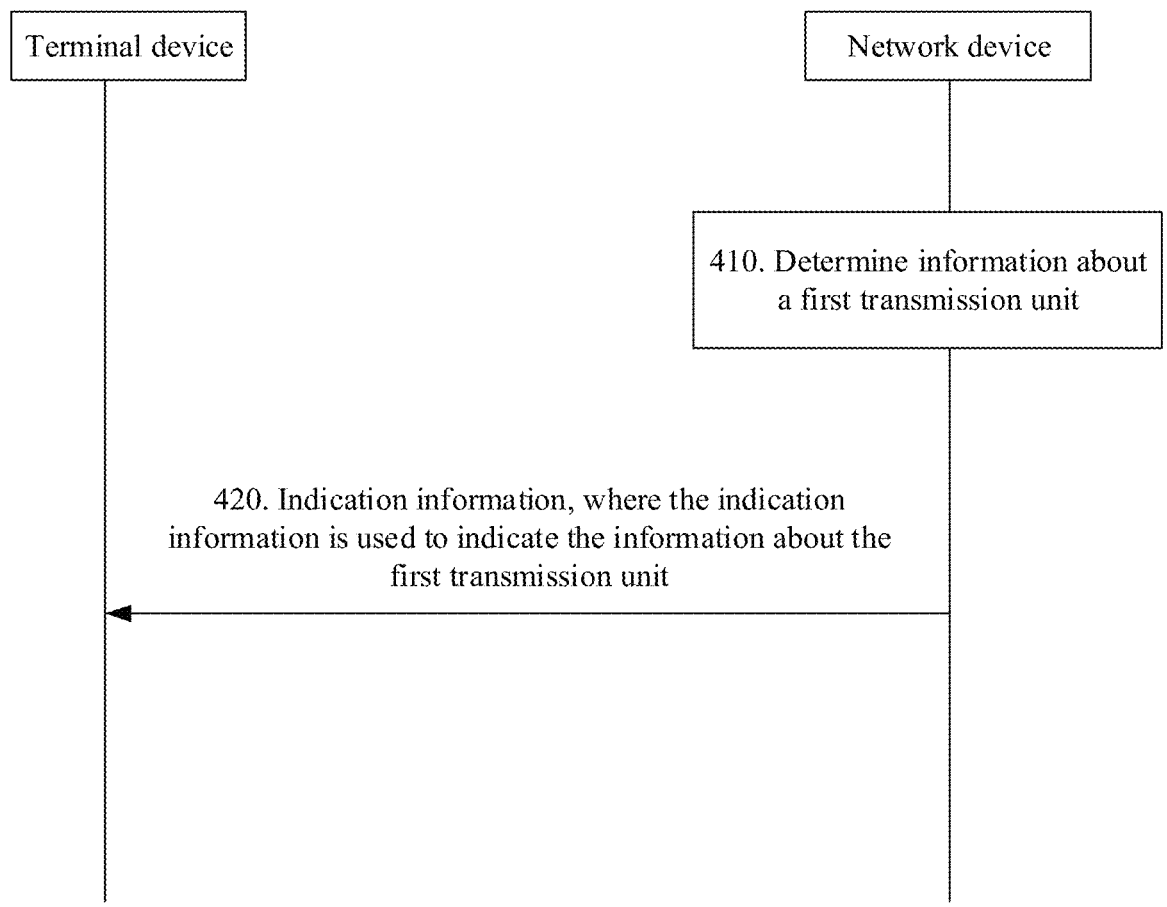
FIG. 4 is a schematic interaction diagram of a communication method according to another embodiment of this application.

FIG. 4 is a schematic interaction diagram of a communication method 400 from a perspective of device interaction according to an embodiment of this application. As shown in the figure, the method 400 may include the following steps.

410. A network device determines information about a first transmission unit. The information about the first transmission unit includes the following information: a starting position of the first transmission unit or an ending position of the first transmission unit, a transmission length of the first transmission unit, and a transmission interval. The transmission interval is an interval between the first transmission unit and a neighboring transmission unit. The first transmission unit is any one of M transmission units or the $1^{st}$ transmission unit in the M transmission units, where M is an integer greater than or equal to 2.

420. The network device sends indication information, where the indication information is used to indicate the information about the first transmission unit. Correspondingly, a terminal device receives the indication information.

Optionally, the transmission unit may include any one of the following: a time domain unit, a frequency domain unit, or a time-frequency unit.

The time domain unit may be, for example, a mini-slot. The frequency domain unit may be, for example, a subband. The mini-slot is used as an example. The terminal device may receive PDSCHs in M mini-slots, and the terminal device receives M PDSCHs.

For ease of understanding, an example in which the transmission unit is a time domain unit, for example, a mini-slot, is used below for description.

The network device may indicate the information about the first transmission unit to the terminal device, and the first transmission unit may be any one of the M transmission units. That is, the network device may indicate information about any one of the M transmission units to the terminal device, or it may be understood as that the network device indicates information about a transmission resource of any one of the M PDSCHs to the terminal device. Alternatively, the first transmission unit may be the $1^{st}$ transmission unit in the M transmission units. That is, the network device may indicate information about the $1^{st}$ transmission unit in the M transmission units to the terminal device, or it may be understood as that the network device indicates information about a transmission resource of a first transmitted PDSCH in the M PDSCHs to the terminal device.

It should be understood that the first transmission unit is named only for differentiation, and does not constitute any limitation on the protection scope of this embodiment of this application. Without loss of generality, the first transmission unit is used for representation below, and a PDSCH transmitted in the first transmission unit is denoted as a first PDSCH.

The network device may indicate S, L, and Δ to the terminal device,
where
S may be used to represent the starting position of the first transmission unit or a starting position of a transmission resource of the first PDSCH in time domain, for example, a symbol starting position (starting from 0);
L may be used to represent a length of the first transmission unit or a time length of the transmission resource of the first PDSCH in time domain, for example, a symbol length occupied for transmission; and
Δ may be used to represent a time interval between two neighboring transmissions, for example, a symbol length between two neighboring transmissions, for example, a symbol length between starting positions of the two neighboring transmissions or a symbol length between ending positions of the two neighboring transmissions, where a time interval of Δ may be reserved between neighboring transmission units.

It should be understood that, for example, if the two neighboring transmissions are a first transmission and a second transmission, in this embodiment of this application, that Δ represents a symbol length between ending positions of the two neighboring transmissions means that Δ represents a symbol length between an ending position of the first transmission and a starting position of the second transmission; and that Δ represents a symbol length between starting positions of two neighboring transmissions means that Δ represents a symbol length between a starting position of the first transmission and the starting position of the second transmission. Descriptions that Δ represents a symbol length between ending positions of two neighboring transmissions and Δ represents a symbol length between starting positions of two neighboring transmissions are uniformly used below.

Communication can become more flexible by using Δ. For example, it can be ensured that in some scenarios, for example, in a high-frequency scenario, beam switching between a plurality of stations is used.

It should be understood that an example in which the transmission unit includes the time domain unit is used for description above. The embodiments of this application are not limited thereto. For example, the transmission unit includes a frequency domain unit. In this case, S may be used to represent the starting position of the first transmission unit or a starting position of the transmission resource of the first PDSCH in frequency domain, for example, a subband starting position; L may be used to represent the length of the first transmission unit or a length of the transmission resource of the first PDSCH in frequency domain, for example, a subband length occupied for transmission; and Δ may be used to represent a frequency domain interval between two neighboring transmissions, for example, a subband length between the two neighboring transmissions, for example, a frequency domain interval between starting positions of the two neighboring transmissions or a frequency domain interval between ending positions of the two neighboring transmissions.

Optionally, the network device may notify the terminal device of Δ by using higher layer signaling (for example, RRC signaling), or may notify the terminal device of Δ by using DCI. This is not limited in this embodiment of this application. For example, Δ may be specified in advance, for example, specified in a protocol in advance or pre-configured by the network device.

Optionally, cyclic prefixes (cyclic prefix, CP) are different for different PDSCH mapping types, and corresponding combinations of S, L, and Δ are different. For example, Δ represents a symbol length between ending positions of two neighboring transmissions, as shown in Table 7 and Table 8.

The CP includes a normal CP (normal CP) and an extended CP (extended CP). A slot format is that 14 OFDM symbols are included, and a CP of each OFDM symbol is a normal CP. A slot format is that 12 OFDM symbols are included, and a CP of each OFDM symbol is an extended CP. A slot format is that 7 OFDM symbols are included, and a CP of each OFDM symbol is a normal CP. It should be understood that the foregoing illustration is merely an example for description, and shall not constitute any limitation on this application.

Figure 5:
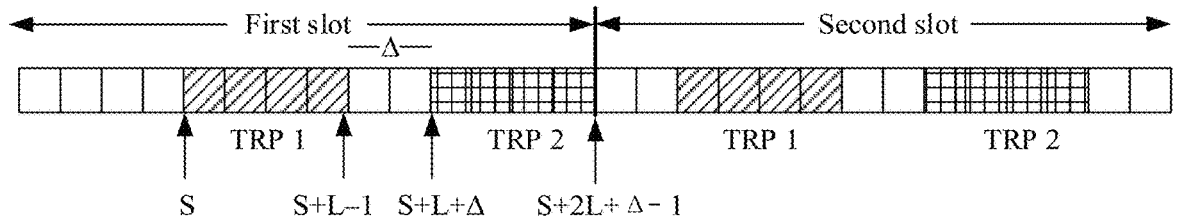
FIG. 5 to FIG. 8 are schematic diagrams of resource allocation applicable to embodiments of this application.

Case 1: As shown in FIG. 5, each internal has a fixed quantity of symbols.

As shown in FIG. 5, a shaded part is a transport block. It can be learned from FIG. 5 that in each slot (slot), there are a same quantity of boxes, to be specific, two boxes, between an ending position for transmitting a transport block by a TPR 1 and a starting position for transmitting a transport block by a TRP 2.

For example, Δ represents a symbol length between ending positions of two neighboring transmissions.

It is assumed that a network device indicates S and L of a first transmission PDSCH (namely, the $1^{st}$ mini-slot) to a terminal device. In this case, it may be determined that an ending position of the first transmission PDSCH is (S+L−1). In this way, a position of a transmission resource for transmitting a PDSCH each time may also be calculated. For example, a starting position of a transmission resource of a second transmission PDSCH (namely, the $2^{nd}$ mini-slot) is (S+L+Δ), a transmission length of the transmission resource of the second transmission PDSCH (namely, the $2^{nd}$ mini-slot) is L, and an ending position of the second transmission PDSCH (namely, the $2^{nd}$ mini-slot) is (S+L+Δ+L−1). As shown in FIG. 5, for ease of understanding, FIG. 5 merely shows a case in which Δ represents a symbol length between ending positions of two neighboring transmissions.

For example, Δ represents a symbol length between starting positions of two neighboring transmissions.

It is assumed that a network device indicates S and L of a first transmission PDSCH (namely, the $1^{st}$ mini-slot) to a terminal device. In this case, it may be determined that an ending position of the first transmission PDSCH is (S+L−1). In this way, a position of a transmission resource for transmitting a PDSCH each time may also be calculated. For example, a starting position of a transmission resource of a second transmission PDSCH (namely, the $2^{nd}$ mini-slot) is (S+Δ), a transmission length of the transmission resource of the second transmission PDSCH (namely, the $2^{nd}$ mini-slot)

TABLE 7

| PDSCH | Normal CP | | | | Extended CP | | | |
|---|---|---|---|---|---|---|---|---|
| mapping type | S | L | S + L | Δ | S | L | S + L | Δ |
| Mapping type A | {0, 1, 2, 3} | {3, ..., 14} | {3, ..., 14} | {0, 1, 2} | {0, 1, 2, 3} | {3, ..., 12} | {3, ..., 12} | {0, 1, 2} |
| Mapping type B | {0, ..., 12} | {2, 4, 7} | {2, ..., 14} | {0, 1, 2} | {0, ..., 10} | {2, 4, 6} | {2, ..., 12} | {0, 1, 2} | is L, and an ending position of the second transmission PDSCH (namely, the $2^{nd}$ mini-slot) is (S+Δ+L−1).

TABLE 8

| PDSCH mapping | Normal CP | | |
|---|---|---|---|
| type | S | L | Δ |
| Mapping type B | {0, ..., 12} | 2 | {0, 1} |
| Mapping type B | {0, ..., 12} | 4 | {0, 1, 2, 3} |
| Mapping type B | {0, ..., 12} | 7 | {0, ..., 6} |

Optionally, the terminal device may determine positions of all transmission units, or in other words, determine positions of transmission resources of all PDSCHs, based on S, L, and Δ.

The following uses a transmission unit as a mini-slot for description with reference to FIG. 5 to FIG. 8.

FIG. 5 to FIG. 8 show several different cases of repeated mini-slot transmission.

Figure 6:
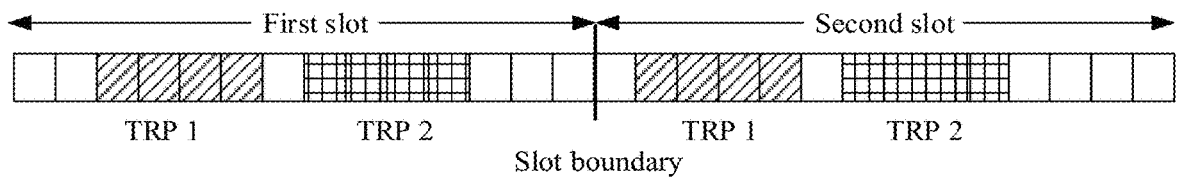

Case 2: As shown in FIG. 6, there are different processing cases for slot boundaries. In other words, a transport block cannot be transmitted across slots.

As shown in FIG. 6, a shaded part is a transport block. It can be learned from FIG. 6 that the transport block is transmitted four times in total in two slots, and a quantity of repeated transmissions in each slot is 2. In other words, in each slot, a TRP 1 transmits one transport block, and a TRP 2 transmits one transport block. In addition, a transport block cannot be transmitted across slots.

In this case, a same transport block cannot cross slots in consideration of a boundary problem of the slot, and therefore, a quantity of repeated transmissions in one slot may be determined. For example, when a starting position or an ending position in a transmission exceeds a slot boundary, for example, a starting position or an ending position in a transmission is located after the 14$^{th}$ symbol (whose symbol number is 13 if a symbol number of the 1$^{st}$ symbol is 0), it may be determined that the starting position in this transmission is the initial symbol position in the next slot.

For example, Δ represents a symbol length between ending positions of two neighboring transmissions.

It is assumed that a network device indicates S and L of a first transmission PDSCH (namely, the 1$^{st}$ mini-slot) to a terminal device. In this case, it may be determined that an ending position of the first transmission PDSCH is (S+L−1). In this way, a position of a transmission resource for transmitting a PDSCH each time may also be calculated. For example, a starting position of a transmission resource of a second transmission PDSCH (namely, the 2$^{nd}$ mini-slot) is (S+L+Δ), a transmission length of the transmission resource of the second transmission PDSCH (namely, the 2$^{nd}$ mini-slot) is L, and an ending position of the second transmission PDSCH (namely, the 2$^{nd}$ mini-slot) is (S+L+Δ+L−1). It is determined whether the starting position or the ending position of the second transmission PDSCH exceeds a slot boundary. If the starting position or the ending position of the second transmission PDSCH exceeds the slot boundary, the starting position of the second transmission PDSCH is a symbol 0 in a next slot, and the ending position of the second transmission PDSCH is a symbol (L−1) in the next slot. Similarly, a starting position of a transmission resource of a third transmission PDSCH may be calculated based on the ending position of the second transmission PDSCH.

For example, Δ represents a symbol length between starting positions of two neighboring transmissions.

It is assumed that a network device indicates S and L of a first transmission PDSCH (namely, the 1$^{st}$ mini-slot) to a terminal device. In this case, it may be determined that an ending position of the first transmission PDSCH is (S+L−1). In this way, a position of a transmission resource for transmitting a PDSCH each time may also be calculated. For example, a starting position of a transmission resource of a second transmission PDSCH (namely, the 2$^{nd}$ mini-slot) is (S+Δ), a transmission length of the transmission resource of the second transmission PDSCH (namely, the 2$^{nd}$ mini-slot) is L, and an ending position of the second transmission PDSCH (namely, the 2$^{nd}$ mini-slot) is (S+Δ+L−1). It is determined whether the starting position or the ending position of the second transmission PDSCH exceeds a slot boundary. If the starting position or the ending position of the second transmission PDSCH exceeds the slot boundary, the starting position of the second transmission PDSCH is a symbol 0 in a next slot, and the ending position of the second transmission PDSCH is a symbol (L−1) in the next slot. Similarly, a starting position of a transmission resource of a third transmission PDSCH may be calculated based on the ending position of the second transmission PDSCH.

Figure 7:
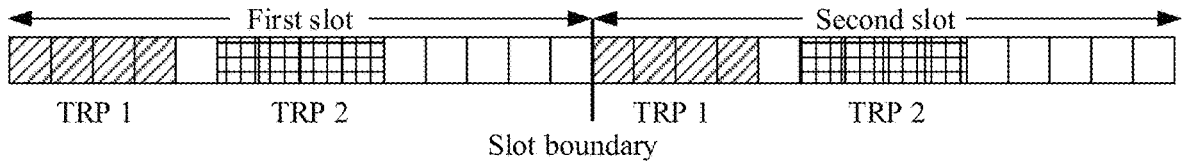

Case 3: As shown in FIG. 7, resource allocation in different slots is the same.

As shown in FIG. 7, a shaded part is a transport block. It can be learned from FIG. 7 that the transport block is transmitted four times in total in two slots, and a quantity of repeated transmissions in each slot is 2. In other words, in each slot, a TRP 1 transmits one transport block, and a TRP 2 transmits one transport block. In addition, in each slot, for example, in a first slot and a second slot, a same transmission unit is occupied for each transmission. As shown in FIG. 7, in each slot, the TPR 1 may occupy the first two transmission units to transmit a transport block (that is, shaded boxes in FIG. 7), and there is one box between a starting position for transmitting the transport block by the TPR 2 and an ending position for transmitting the transport block by the TRP 1. It should be understood that in FIG. 7, a transmission unit occupied by a transport block in each slot is merely an example for description, and does not constitute any limitation on the protection scope of this embodiment of this application.

In this case, a quantity of repeated transmissions in one slot may be determined in consideration of resource allocation in only one slot. For example, a transmission resource for each transmission in one slot may be determined, and then transmission resources for transmissions in all slots may be determined.

For example, Δ represents a symbol length between ending positions of two neighboring transmissions.

It is assumed that a network device indicates S and L of a first transmission PDSCH (namely, the 1$^{st}$ mini-slot) to a terminal device. In this case, it may be determined that an ending position of the first transmission PDSCH is (S+L−1). In this way, a position of a transmission resource for transmitting a PDSCH each time may also be calculated. For example, a starting position of a transmission resource of a second transmission PDSCH (namely, the 2$^{nd}$ mini-slot) is (S+L+Δ), a transmission length of the transmission resource of the second transmission PDSCH (namely, the 2$^{nd}$ mini-slot) is L, and an ending position of the second transmission PDSCH (namely, the 2$^{nd}$ mini-slot) is (S+L+Δ+L−1). Similarly, a starting position of a transmission resource of a third transmission PDSCH may be calculated based on the ending position of the second transmission PDSCH. In this case, an ending position of a transmitted PDSCH does not exceed a slot boundary, for example, the slot boundary shown in FIG. 7. However, all the resource allocation is the same in different slots.

For example, Δ represents a symbol length between starting positions of two neighboring transmissions.

It is assumed that a network device indicates S and L of a first transmission PDSCH (namely, the 1$^{st}$ mini-slot) to a terminal device. In this case, it may be determined that an ending position of the first transmission PDSCH is (S+L−1). In this way, a position of a transmission resource for transmitting a PDSCH each time may also be calculated. For example, a starting position of a transmission resource of a second transmission PDSCH (namely, the 2$^{nd}$ mini-slot) is (S+Δ), a transmission length of the transmission resource of the second transmission PDSCH (namely, the 2$^{nd}$ mini-slot) is L, and an ending position of the second transmission PDSCH (namely, the 2$^{nd}$ mini-slot) is (S+Δ+L−1). Similarly, a starting position of a transmission resource of a third transmission PDSCH may be calculated based on the ending position of the second transmission PDSCH. In this case, an ending position of a transmitted PDSCH does not exceed a slot boundary. However, all the resource allocation is the same in different slots.

Figure 8:
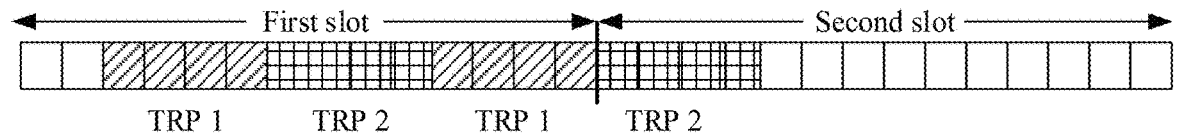

Case 4: FIG. 8 shows continuous time unit allocation.

As shown in FIG. 8, a shaded part is a transport block. It can be learned from FIG. 8 that time units occupied by transport blocks are continuous.

For example, Δ represents a symbol length between ending positions of two neighboring transmissions.

It is assumed that a network device indicates S and L of a first transmission PDSCH (namely, the 1$^{st}$ mini-slot) to a terminal device. In this case, it may be determined that an ending position of the first transmission PDSCH is (S+L−1). In this way, a position of a transmission resource for transmitting a PDSCH each time may also be calculated. For example, a starting position of a transmission resource of a second transmission PDSCH (namely, the $2^{nd}$ mini-slot) is (S+L), a transmission length of the transmission resource of the second transmission PDSCH (namely, the $2^{nd}$ mini-slot) is L, and an ending position of the second transmission PDSCH (namely, the $2^{nd}$ mini-slot) is (S+L+L−1). Similarly, a starting position of a transmission resource of a third transmission PDSCH may be calculated based on the ending position of the second transmission PDSCH.

In this case, $\Delta$ is 0. Therefore, $\Delta$ may not be indicated.

The foregoing describes four cases as examples. The embodiments of this application are not limited thereto. Any manner in which the terminal device can determine information about all transmission units based on information about one transmission unit shall fall within the protection scope of the embodiments of this application. For example, the terminal device may also determine positions of all transmission units based on an ending position of a first transmission unit, L, and $\Delta$.

Optionally, in consideration of $\Delta$, a time domain position of a DMRS is adjusted in the embodiments of this application.

As described above, the DMRS may include a front-loaded DMRS and an additional DMRS. The following separately describes positions of the front-loaded DMRS and the additional DMRS.

Front-Loaded DMRS

Different PDSCH mapping types correspond to different front-loaded DMRSs. The PDSCH mapping type being a mapping type A is used as an example for description.

For example, when DMRS-typeA-Position is 'pos2',
as described above, $l_0$ represents the initial symbol position of a front-loaded DMRS corresponding to a first transmission PDSCH in a slot.

In an existing protocol, $S=\{0, 1, 2\}$, $(S+L)=\{3, \ldots, 14\}$, and a position corresponding to the DMRS is $l_0=2$. In this case, the DMRS is located inside a time-frequency resource position allocated to a PDSCH.

It is assumed that the initial symbol position of a front-loaded DMRS of a DMRS corresponding to an $(n+1)^{th}$ transmission PDSCH is $l_n$, where n is an integer greater than or equal to 0. With reference to the case 1 to the case 4 of repeated mini-slot transmissions, a manner for determining the initial symbol position of a front-loaded DMRS of a DMRS corresponding to each PDSCH is described.

The description is provided with reference to the case 1.

For example, $\Delta$ represents a symbol length between ending positions of two neighboring transmissions.

The initial symbol position $l_n$ of the front-loaded DMRS of the DMRS corresponding to the $(n+1)^{th}$ transmission PDSCH is $l_n=\text{mod}(l_0+n*(L+\Delta), 14)$, where mod is a modulo function, and n is an integer greater than or equal to 0.

For example, $\Delta$ represents a symbol length between starting positions of two neighboring transmissions.

The initial symbol position $l_n$ of the front-loaded DMRS of the DMRS corresponding to the $(n+1)^{th}$ transmission PDSCH is $l_n=\text{mod}(l_0+n*\Delta, 14)$, where mod is a modulo function, and n is an integer greater than or equal to 0.

The description is provided with reference to the case 2.

For example, $\Delta$ represents a symbol length between ending positions of two neighboring transmissions.

In a first slot, the initial symbol position $l_n$ of the front-loaded DMRS of the DMRS corresponding to the $(n+1)^{th}$ transmission PDSCH is $l_n=l_0+n*(L+\Delta)$. In this case, when a slot boundary is crossed, if a total of N1 PDSCHs are transmitted in the first slot, the initial symbol position N1+m+1 of a front-loaded DMRS of a DMRS corresponding to an $(N1+m+1)^{th}$ transmission PDSCH is $l_{N1+m}=l_0+m*(L+\Delta)$ or $N1+m=l_0-S+m*(L+\Delta)$, where m is calculated starting from 0 in a second slot, and m is an integer greater than or equal to 0. For example, as shown in FIG. 6, when the initial symbol position of a front-loaded DMRS of a DMRS corresponding to a PDSCH transmitted by the TRP 1 in the second slot is calculated, m=0; when the initial symbol position of a front-loaded DMRS of a DMRS corresponding to a PDSCH transmitted by the TRP 2 in the second slot is calculated, m=1.

For example, $\Delta$ represents a symbol length between starting positions of two neighboring transmissions.

In a first slot, the initial symbol position $l_n$ of the front-loaded DMRS of the DMRS corresponding to the $(n+1)^{th}$ transmission PDSCH is $l_n=l_0+n*\Delta$. In this case, when a slot boundary is crossed, if a total of N1 PDSCHs are transmitted in the first slot, the initial symbol position N1+m+1 of a front-loaded DMRS of a DMRS corresponding to an $(N1+m+1)^{th}$ transmission PDSCH is $N1+m=l_0+m*\Delta$ or $N1+m=l_0-S+m*\Delta$, where m is calculated starting from 0 in a second slot, and m is an integer greater than or equal to 0. For example, as shown in FIG. 6, when the initial symbol position of a front-loaded DMRS of a DMRS corresponding to a PDSCH transmitted by the TRP 1 in the second slot is calculated, m=0; when the initial symbol position of a front-loaded DMRS of a DMRS corresponding to a PDSCH transmitted by the TRP 2 in the second slot is calculated, m=1.

The description is provided with reference to the case 3.

For example, $\Delta$ represents a symbol length between ending positions of two neighboring transmissions.

In a first slot, the initial symbol position $l_n$ of the front-loaded DMRS of the DMRS corresponding to the $(n+1)^{th}$ transmission PDSCH is $l_n=l_0+n*(L+\Delta)$. In this case, n+1 transmissions are all in the first slot, and a position of a DMRS in another slot is the same as that in the first slot.

For example, $\Delta$ represents a symbol length between starting positions of two neighboring transmissions.

In a first slot, the initial symbol position $l_n$ of the front-loaded DMRS of the DMRS corresponding to the $(n+1)^{th}$ transmission PDSCH is $l_n=l_0+n*\Delta$. In this case, n+1 transmissions are all in the first slot, and a position of a DMRS in another slot is the same as that in the first slot.

The description is provided with reference to the case 4.

In the case 4, the initial symbol position $l_n$ of the front-loaded DMRS of the DMRS corresponding to the $(n+1)^{th}$ transmission PDSCH is $l_n=l_0+n*(L)$.

For example, when DMRS-typeA-Position is 'pos3', $l_0=3$.

In a scenario, $S=\{0, 1, 2\}$ and $(S+L)=\{4, \ldots, 14\}$. In this case, the DMRS is located inside a time-frequency resource position allocated to a PDSCH.

It is assumed that the initial symbol position of a front-loaded DMRS of a DMRS corresponding to an $(n+1)^{th}$ transmission PDSCH is $l_n$, where n is an integer greater than or equal to 0. With reference to the case 1 to the case 4 of repeated mini-slot transmissions, a manner for determining the initial symbol position of a front-loaded DMRS of a DMRS corresponding to each PDSCH is described.

The description is provided with reference to the case 1.

For example, $\Delta$ represents a symbol length between ending positions of two neighboring transmissions.

The initial symbol position $l_n$ of the front-loaded DMRS of the DMRS corresponding to the $(n+1)^{th}$ transmission PDSCH is $l_n=\text{mod}(l_0+n*(L+\Delta), 14)$, where mod is a modulo function.

For example, $\Delta$ represents a symbol length between starting positions of two neighboring transmissions.

The initial symbol position $l_n$ of the front-loaded DMRS of the DMRS corresponding to the $(n+1)^{th}$ transmission PDSCH is $l_n=\mod(l_0+n*\Delta, 14)$, where mod is a modulo function.

The description is provided with reference to the case 2.

For example, $\Delta$ represents a symbol length between ending positions of two neighboring transmissions.

In a first slot, the initial symbol position $l_n$ of the front-loaded DMRS of the DMRS corresponding to the $(n+1)^{th}$ transmission PDSCH is $l_n=l_0+n*(L+\Delta)$. In this case, when a slot boundary is crossed, if a total of N1 PDSCHs are transmitted in the first slot, the initial symbol position $l_{N+m}$ of a front-loaded DMRS of a DMRS corresponding to an $(N+m+1)^{th}$ transmission PDSCH is $l_{N+m}=l_0+m*(L+\Delta)$ or $l_{N+m}=l_0-S+m*(L+\Delta)$, where m is calculated starting from 0 in a second slot, and m is an integer greater than or equal to 0. For example, as shown in FIG. 6, when the initial symbol position of a front-loaded DMRS of a DMRS corresponding to a PDSCH transmitted by the TRP 1 in the second slot is calculated, m=0; when the initial symbol position of a front-loaded DMRS of a DMRS corresponding to a PDSCH transmitted by the TRP 2 in the second slot is calculated, m=1.

For example, $\Delta$ represents a symbol length between starting positions of two neighboring transmissions.

In a first slot, the initial symbol position $l_n$ of the front-loaded DMRS of the DMRS corresponding to the $(n+1)^{th}$ transmission PDSCH is $l_n=l_0+n*\Delta$. In this case, when a slot boundary is crossed, if a total of N1 PDSCHs are transmitted in the first slot, the initial symbol position $l_{N+m}$ of a front-loaded DMRS of a DMRS corresponding to an $(N+m+1)^{th}$ transmission PDSCH is $l_{N+m}=l_0+m*\Delta$ or $l_{N+m}=l_0-S+m*\Delta$, where m is calculated starting from 0 in a second slot, and m is an integer greater than or equal to 0. For example, as shown in FIG. 6, when the initial symbol position of a front-loaded DMRS of a DMRS corresponding to a PDSCH transmitted by the TRP 1 in the second slot is calculated, m=0; when the initial symbol position of a front-loaded DMRS of a DMRS corresponding to a PDSCH transmitted by the TRP 2 in the second slot is calculated, m=1.

The description is provided with reference to the case 3.

For example, $\Delta$ represents a symbol length between ending positions of two neighboring transmissions.

In a first slot, the initial symbol position $l_n$ of the front-loaded DMRS of the DMRS corresponding to the $(n+1)^{th}$ transmission PDSCH is $l_n=l_0+n*(L+\Delta)$. In this case, n+1 transmissions are all in the first slot, and a position of a DMRS in another slot is the same as that in the first slot.

For example, $\Delta$ represents a symbol length between starting positions of two neighboring transmissions.

In a first slot, the initial symbol position $l_n$ of the front-loaded DMRS of the DMRS corresponding to the $(n+1)^{th}$ transmission PDSCH is $l_n=l_0+n*\Delta$. In this case, n+1 transmissions are all in the first slot, and a position of a DMRS in another slot is the same as that in the first slot.

The description is provided with reference to the case 4.

In the case 4, the initial symbol position $l_n$ of the front-loaded DMRS of the DMRS corresponding to the $(n+1)^{th}$ transmission PDSCH is $l_n=l_0+n*(L)$.

In another scenario, S=4 and (S+L)={5, . . . , 14}. In this case, the DMRS is not inside the time-frequency resource position allocated for the PDSCH. In this case, only one front-loaded DMRS may be placed, that is, $l_0=2$ is initialized. Alternatively, when A is greater than 0, all front-loaded DMRSs are placed in a symbol preceding the PDSCH, that is, $l_0=-1$.

When the PDSCH mapping type is a type B, $l_0$ represents a symbol position of the initial demodulation reference signal in a slot relative to the starting symbol of the PDSCH. In an existing protocol, $l_0=0$. In allocation of a plurality of mini-slot PDSCH transmissions, there are two methods:

Method 1: If it is defined that $l_0$ is a starting position for first transmission of a PDSCH, a position of a front-loaded DMRS corresponding to another PDSCH is similar to the foregoing position.

The description is provided with reference to the case 1.

For example, $\Delta$ represents a symbol length between ending positions of two neighboring transmissions.

The initial symbol position $l_n$ of the front-loaded DMRS of the DMRS corresponding to the $(n+1)^{th}$ transmission PDSCH is $l_n=\mod(l_0+n*(L+\Delta), 14)$, where mod is a modulo function.

For example, $\Delta$ represents a symbol length between starting positions of two neighboring transmissions.

The initial symbol position $l_n$ of the front-loaded DMRS of the DMRS corresponding to the $(n+1)^{th}$ transmission PDSCH is $l_n=\mod(l_0+n*\Delta, 14)$, where mod is a modulo function.

The description is provided with reference to the case 2.

For example, $\Delta$ represents a symbol length between ending positions of two neighboring transmissions.

In a first slot, the initial symbol position $l_n$ of the front-loaded DMRS of the DMRS corresponding to the $(n+1)^{th}$ transmission PDSCH is $l_n=l_0+n*(L+\Delta)$. In this case, when a slot boundary is crossed, if a total of N1 PDSCHs are transmitted in the first slot, the initial symbol position $l_{N+m}$ of a front-loaded DMRS of a DMRS corresponding to an $(N+m+1)^{th}$ transmission PDSCH is $l_{N+m}=l_0+m*(L+\Delta)$ or $l_{N+m}=l_0-S+m*(L+\Delta)$, where m is calculated starting from 0 in a second slot, and m is an integer greater than or equal to 0. For example, as shown in FIG. 6, when the initial symbol position of a front-loaded DMRS of a DMRS corresponding to a PDSCH transmitted by the TRP 1 in the second slot is calculated, m=0; when the initial symbol position of a front-loaded DMRS of a DMRS corresponding to a PDSCH transmitted by the TRP 2 in the second slot is calculated, m=1.

For example, $\Delta$ represents a symbol length between starting positions of two neighboring transmissions.

In a first slot, the initial symbol position $l_n$ of the front-loaded DMRS of the DMRS corresponding to the $(n+1)^{th}$ transmission PDSCH is $l_n=l_0+n*\Delta$. In this case, when a slot boundary is crossed, if a total of N1 PDSCHs are transmitted in the first slot, the initial symbol position $l_{N+m}$ of a front-loaded DMRS of a DMRS corresponding to an $(N+m+1)^{th}$ transmission PDSCH is $l_{N+m}=l_0+m*\Delta$ or $l_{N+m}=l_0-S+m*\Delta$, where m is calculated starting from 0 in a second slot, and m is an integer greater than or equal to 0. For example, as shown in FIG. 6, when the initial symbol position of a front-loaded DMRS of a DMRS corresponding to a PDSCH transmitted by the TRP 1 in the second slot is calculated, m=0; when the initial symbol position of a front-loaded DMRS of a DMRS corresponding to a PDSCH transmitted by the TRP 2 in the second slot is calculated, m=1.

The description is provided with reference to the case 3.

For example, $\Delta$ represents a symbol length between ending positions of two neighboring transmissions.

In a first slot, the initial symbol position $l_n$ of the front-loaded DMRS of the DMRS corresponding to the $(n+1)^{th}$ transmission PDSCH is $l_n=l_0+n*(L+\Delta)$. In this case, n+1 transmissions are all in the first slot, and a position of a DMRS in another slot is the same as that in the first slot.

For example, Δ represents a symbol length between starting positions of two neighboring transmissions.

In a first slot, the initial symbol position $l_n$ of the front-loaded DMRS of the DMRS corresponding to the $(n+1)^{th}$ transmission PDSCH is $l_n = l_0 + n*\Delta$. In this case, n+1 transmissions are all in the first slot, and a position of a DMRS in another slot is the same as that in the first slot.

The description is provided with reference to the case 4.

In the case 4, the initial symbol position $l_n$ of the front-loaded DMRS of the DMRS corresponding to the $(n+1)^{th}$ transmission PDSCH is $l_n = l_0 + n*(L)$.

Method 2: It is defined that $l_0$ is a starting position relative to transmission of each PDSCH, that is, a position of a front-loaded DMRS corresponding to each PDSCH is $l_0$ relative to the starting position of the PDSCH, where $l_0=0$.

Additional DMRS

When the additional DMRS is located inside a time-frequency resource position allocated to the PDSCH, a processing case is consistent with the foregoing case of processing the front-loaded DMRS. The following gives a brief description. For details, refer to the foregoing description of determining the position of the front-loaded DMRS.

It is assumed that $l_{ad-0}$ represents a position of a symbol of an additional DMRS of a DMRS corresponding to a first transmission PDSCH in a slot. It is assumed that a symbol position of an additional DMRS of a DMRS corresponding to an $(n+1)^{th}$ transmission PDSCH is $l_{ad-n}$, where n is an integer greater than or equal to 0. With reference to the case 1 to the case 4 of repeated mini-slot transmissions, a manner for determining a symbol position of an additional DMRS of a DMRS corresponding to each PDSCH is described.

The description is provided with reference to the case 1.

For example, Δ represents a symbol length between ending positions of two neighboring transmissions.

The symbol position $l_{ad-n}$ of the additional DMRS of the DMRS corresponding to the $(n+1)^{th}$ transmission PDSCH is $l_{ad-n} = \text{mod}(l_{ad-0} + n*(L+\Delta), 14)$, where mod is a modulo function.

For example, Δ represents a symbol length between starting positions of two neighboring transmissions.

The symbol position $l_{ad-n}$ of the additional DMRS of the DMRS corresponding to the $(n+1)^{th}$ transmission PDSCH is $l_{ad-n} = \text{mod}(l_{ad-0} + n*\Delta, 14)$, where mod is a modulo function.

The description is provided with reference to the case 2.

For example, Δ represents a symbol length between ending positions of two neighboring transmissions.

In a first slot, the symbol position $l_{ad-n}$ of the additional DMRS of the DMRS corresponding to the $(n+1)^{th}$ transmission PDSCH is $l_{ad-n} = l_{ad-0} + n*(L+\Delta)$. In this case, when a slot boundary is crossed, if a total of N1 PDSCHs are transmitted in the first slot, the symbol position $l_{ad-N+m}$ of an additional DMRS of a DMRS corresponding to an $(N+m+1)^{th}$ transmission PDSCH is $l_{ad-N+m} = l_{ad-0} + m*(L+\Delta)$ or $l_{ad-N+m} = l_{ad-0} - S + m*(L+\Delta)$, where m is calculated starting from 0 in a second slot, and m is an integer greater than or equal to 0. For example, as shown in FIG. 6, when a symbol position of an additional DMRS of a DMRS corresponding to a PDSCH transmitted by the TRP 1 in the second slot is calculated, m=0; when a symbol position of an additional DMRS of a DMRS corresponding to a PDSCH transmitted by the TRP 2 in the second slot is calculated, m=1.

For example, Δ represents a symbol length between starting positions of two neighboring transmissions.

In a first slot, the symbol position $l_{ad-n}$ of the additional DMRS of the DMRS corresponding to the $(n+1)^{th}$ transmission PDSCH is $l_{ad-n} = l_{ad-0} + n*\Delta$. In this case, when a slot boundary is crossed, if a total of N1 PDSCHs are transmitted in the first slot, the symbol position $l_{ad-N+m}$ of an additional DMRS of a DMRS corresponding to an $(N+m+1)^{th}$ transmission PDSCH is $l_{ad-N+m} = l_{ad-0} + m*\Delta$ or $l_{ad-N+m} = l_{ad-0} - S + m*\Delta$, where m is calculated starting from 0 in a second slot, and m is an integer greater than or equal to 0. For example, as shown in FIG. 6, when a symbol position of an additional DMRS of a DMRS corresponding to a PDSCH transmitted by the TRP 1 in the second slot is calculated, m=0; when a symbol position of an additional DMRS of a DMRS corresponding to a PDSCH transmitted by the TRP 2 in the second slot is calculated, m=1.

The description is provided with reference to the case 3.

For example, Δ represents a symbol length between ending positions of two neighboring transmissions.

In a first slot, the symbol position $l_{ad-n}$ of the additional DMRS of the DMRS corresponding to the $(n+1)^{th}$ transmission PDSCH is $l_{ad-n} = l_{ad-0} + n*(L+\Delta)$. In this case, n+1 transmissions are all in the first slot, and a position of a DMRS in another slot is the same as that in the first slot.

For example, Δ represents a symbol length between starting positions of two neighboring transmissions.

In a first slot, the symbol position $l_{ad-n}$ of the additional DMRS of the DMRS corresponding to the $(n+1)^{th}$ transmission PDSCH is $l_{ad-n} = l_{ad-0} + n*\Delta$. In this case, n+1 transmissions are all in the first slot, and a position of a DMRS in another slot is the same as that in the first slot.

The description is provided with reference to the case 4.

In the case 4, the symbol position $l_{ad-n}$ of the additional DMRS of the DMRS corresponding to the $(n+1)^{th}$ transmission PDSCH is $l_{ad-n} = l_{ad-0} + n*(L)$.

It should be understood that in the foregoing embodiment, the PDSCH is used as an example for description. However, this constitutes no limitation on this application, and the PDSCH may be replaced with data.

Based on the foregoing technical solution, the terminal device may determine, based on the N DMRS ports indicated by the DCI, the DMRS port corresponding to the DMRS used to demodulate each PDSCH. The N DMRS ports indicated by the DCI may be used for the M PDSCHs. In other words, each PDSCH may correspond to one or more DMRS ports. In addition, at least two of the M PDSCHs correspond to different DMRS ports, or each of the M PDSCHs corresponds to a same DMRS port. In either case, the terminal device may determine the DMRS port corresponding to the DMRS used to demodulate each PDSCH, to further correctly demodulate the PDSCH and ensure the communication performance.

The embodiments described in this specification may be independent solutions, or may be combined based on internal logic. These solutions all fall within the protection scope of this application. For example, the embodiment in FIG. 3 and the embodiment in FIG. 4 may be used independently, or may be used in combination.

It may be understood that in the foregoing method embodiments, a method and an operation that are implemented by the terminal device may alternatively be implemented by a component (for example, a chip or a circuit) that may be used in the terminal device, and a method and an operation that are implemented by the network device may alternatively be implemented by a component (for example, a chip or a circuit) that may be used in the network device.

The methods provided in the embodiments of this application are described above in detail with reference to FIG. 3 to FIG. 8. Communications apparatuses provided in the embodiments of this application are described below in detail with reference to FIG. 9 to FIG. 12. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from a perspective of interaction between network elements. It may be understood that, to implement the foregoing function, each network element, such as a transmit end device or a receive end device, includes a corresponding hardware structure and/or software module for performing each function. A person skilled in the art may be aware that units and algorithm steps in the examples described with reference to the embodiments disclosed in this specification can be implemented by electronic hardware or a combination of computer software and electronic hardware. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, a transmit end device or a receive end device may be divided into functional modules based on the foregoing method examples. For example, the transmit end device or the receive end device may be divided into functional modules corresponding to functions, or two or more functions may be integrated into one processing module. The integrated module may be implemented in a form of hardware, or may be implemented in a form of a software functional module. It should be noted that, in the embodiments of this application, module division is an example, and is merely logical function division. During actual implementation, another division manner may be used. An example in which functional modules are divided based on functions is used below for description.

Figure 9:
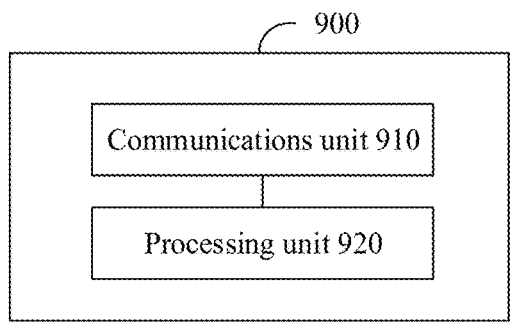
FIG. 9 is a schematic block diagram of a communications apparatus according to an embodiment of this application.

FIG. 9 is a schematic block diagram of a communications apparatus according to an embodiment of this application. As shown in the figure, the communications apparatus 900 may include a communications unit 910, and optionally, may further include a processing unit 920. The communications unit 910 may communicate with the outside, and the processing unit 920 is configured to process data. The communications unit 910 may also be referred to as a communications interface or a transceiver unit.

In a possible design, the communications apparatus 900 may implement a step or a procedure performed by the terminal device in the foregoing method embodiments, for example, may be the terminal device, or a chip or circuit configured in the terminal device. In this case, the communications apparatus 900 may be referred to as a terminal device. The communications unit 910 is configured to perform sending/receiving-related operations on a terminal device side in the foregoing method embodiments, and the processing unit 920 is configured to perform processing-related operations of the terminal device in the foregoing method embodiments.

In a possible implementation, the communications unit 910 is configured to: receive downlink control information DCI, where the DCI indicates N demodulation reference signal DMRS ports, the N DMRS ports correspond to M physical downlink shared channels PDSCHs, at least two of the M PDSCHs correspond to different DMRS ports, and N and M are integers greater than or equal to 2. The communications unit 910 is further configured to receive the M PDSCHs based on the DCI.

Optionally, the N DMRS ports are configured to determine a quantity of DMRS ports, the quantity of DMRS ports represents a quantity of DMRS ports corresponding to each PDSCH, and the quantity of DMRS ports is used to determine the DMRS port corresponding to each PDSCH.

Optionally, there is a correspondence between the N DMRS ports and the M PDSCHs, and the correspondence is used to determine the DMRS port corresponding to each PDSCH.

Optionally, a sequence of the N DMRS ports is used to determine a correspondence between the N DMRS ports and the M PDSCHs.

In another possible implementation, the communications unit 910 is configured to receive downlink control information DCI, where the DCI indicates N demodulation reference signal DMRS ports, the N DMRS ports correspond to each of M physical downlink shared channels PDSCHs, the N DMRS ports correspond to different TCI-states in at least two transmission units, N is an integer greater than or equal to 1, and M is an integer greater than or equal to 2. The communications unit 910 is further configured to receive the M PDSCHs based on the DCI.

Optionally, the transmission unit configured to transmit the PDSCH is determined based on a starting position of the transmission unit, a length of the transmission unit, and an interval between neighboring transmission units.

Optionally, the DCI indicates a plurality of transmission configuration indicator TCI-states, and a sequence of the plurality of TCI-states is used to determine a TCI-state corresponding to a transmission unit in a transmission unit.

Optionally, there is a correspondence between a transmission unit and a transmission configuration indicator TCI-state, and the correspondence is used to determine a TCI-state corresponding to a DMRS port in a transmission unit.

Optionally, the TCI-state includes a plurality of TCI substates, and that there is a correspondence between a transmission unit and a transmission configuration indicator TCI-state includes that there is a correspondence between the transmission unit and the TCI substates in the TCI-state.

Optionally, the transmission unit includes a time domain unit and/or a frequency domain unit.

The communications apparatus 900 may implement steps or procedures performed by the terminal device in the method 300 and the method 400 according to the embodiments of this application. The communications apparatus 900 may include units configured to perform methods performed by the terminal device in the method 300 in FIG. 3 and the method in the method 400 in FIG. 4. In addition, the units in the communications apparatus 900 and the foregoing other operations and/or functions are separately intended to implement corresponding procedures of the method 300 in FIG. 3 and the method 400 in FIG. 4.

When the communications apparatus 900 is configured to perform the method 300 in FIG. 3, the communications unit 910 may be configured to perform step 310 and step 320 in the method 300, and the processing unit 920 may be configured to perform some steps such as determining a DMRS port in the method 300.

When the communications apparatus 900 is configured to perform the method 400 in FIG. 4, the communications unit 910 may be configured to perform step 420 in the method 400, and the processing unit 920 may be configured to perform some steps such as determining transmission unit information in the method 400.

It should be understood that a specific process in which each unit performs the foregoing corresponding steps is described in detail in the foregoing method embodiments. For brevity, details are not described herein again.

Figure 10:
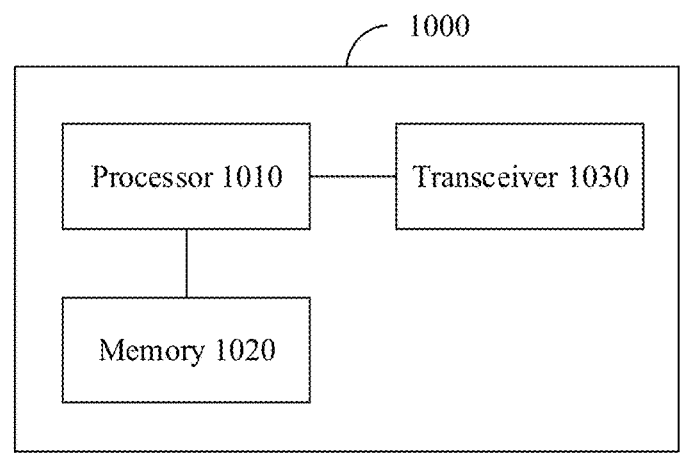
FIG. 10 is another schematic block diagram of a communications apparatus according to an embodiment of this application.

It should be further understood that the communications unit 910 in the communications apparatus 900 may be implemented by using a transceiver 1030 in a terminal device 1000 shown in FIG. 10, and the processing unit 920 in the communications apparatus 900 may be implemented by using a processor 1010 in the terminal device 1000 shown in FIG. 10. The transceiver may include a transmitter and/or a receiver, to respectively implement functions of a sending unit and a receiving unit.

It should be further understood that the communications unit 910 in the communications apparatus 900 may alternatively be an input/output interface.

In another possible design, the communications apparatus 900 may implement a step or a procedure performed by the network device in the foregoing method embodiments, for example, may be the network device, or a chip or circuit configured in the network device. In this case, the communications apparatus 900 may be referred to as a network device. The communications unit 910 is configured to perform sending/receiving-related operations on a network device side in the foregoing method embodiments, and the processing unit 920 is configured to perform processing-related operations of the network device in the foregoing method embodiments.

In a possible implementation, the processing unit 920 is configured to: generate downlink control information DCI, where the DCI indicates N demodulation reference signal DMRS ports, the N DMRS ports correspond to M physical downlink shared channels PDSCHs, at least two of the M PDSCHs correspond to different DMRS ports, and N and M are integers greater than or equal to 2. The communications unit 910 is configured to send the DCI.

Optionally, the N DMRS ports are configured to determine a quantity of DMRS ports, the quantity of DMRS ports represents a quantity of DMRS ports corresponding to each PDSCH, and the quantity of DMRS ports is used to determine the DMRS port corresponding to each PDSCH.

Optionally, there is a correspondence between the N DMRS ports and the M PDSCHs, and the correspondence is used to determine the DMRS port corresponding to each PDSCH.

Optionally, a sequence of the N DMRS ports is used to determine a correspondence between the N DMRS ports and the M PDSCHs.

In another possible implementation, the processing unit 920 is configured to generate downlink control information DCI, where the DCI indicates N demodulation reference signal DMRS ports, the N DMRS ports correspond to each of M physical downlink shared channels PDSCHs, the N DMRS ports correspond to different TCI-states in at least two transmission units, N is an integer greater than or equal to 1, and M is an integer greater than or equal to 2. The communications unit 910 is configured to send the DCI.

Optionally, the transmission unit configured to transmit the PDSCH is determined based on a starting position of the transmission unit, a length of the transmission unit, and an interval between neighboring transmission units.

Optionally, the DCI indicates a plurality of transmission configuration indicator TCI-states, and a sequence of the plurality of TCI-states is used to determine a TCI-state corresponding to a transmission unit in a transmission unit.

Optionally, there is a correspondence between a transmission unit and a transmission configuration indicator TCI-state, and the correspondence is used to determine a TCI-state corresponding to a DMRS port in a transmission unit.

Optionally, the TCI-state includes a plurality of TCI substates, and that there is a correspondence between a transmission unit and a transmission configuration indicator TCI-state includes that there is a correspondence between the transmission unit and the TCI substates in the TCI-state.

Optionally, the transmission unit includes a time domain unit and/or a frequency domain unit.

The communications apparatus 900 may implement steps or procedures performed by the network device in the method 300 and the method 400 according to the embodiments of this application. The communications apparatus 900 may include units configured to perform methods performed by the network device in the method 300 in FIG. 3 and the method in the method 400 in FIG. 4. In addition, the units in the communications apparatus 900 and the foregoing other operations and/or functions are separately intended to implement corresponding procedures of the method 300 in FIG. 3 and the method 400 in FIG. 4.

When the communications apparatus 900 is configured to perform the method 300 in FIG. 3, the communications unit 910 may be configured to perform step 310 in the method 300.

When the communications apparatus 900 is configured to perform the method 400 in FIG. 4, the communications unit 910 may be configured to perform step 420 in the method 400, and the processing unit 920 may be configured to perform step 410 in the method 400.

It should be understood that a specific process in which each unit performs the foregoing corresponding steps is described in detail in the foregoing method embodiments. For brevity, details are not described herein again.

It should be further understood that the communications unit in the communications apparatus 900 may be implemented by using a transceiver 1030 in a network device 1000 shown in FIG. 10, and the processing unit 920 in the communications apparatus 900 may be implemented by using a processor 1010 in the network device 1000 shown in FIG. 10.

It should be further understood that the communications unit 910 in the communications apparatus 900 may alternatively be an input/output interface. The transceiver may include a transmitter and/or a receiver, to respectively implement functions of a sending unit and a receiving unit.

FIG. 10 is another schematic block diagram of a communications apparatus 1000 according to an embodiment of this application. As shown in the figure, the communications apparatus 1000 includes a processor 1010, a memory 1020, and a transceiver 1030. The memory 1020 stores a program. The processor 1010 is configured to execute the program stored in the memory 1020, and the execution of the program stored in the memory 1020 enables the processor 1010 to perform processing-related steps in the foregoing method embodiments, and enables the processor 1010 to control the transceiver 1030 to perform sending/receiving-related steps in the foregoing method embodiments.

In an implementation, the communications apparatus 1000 is configured to perform an action performed by the terminal device in the foregoing method embodiments. In this case, the execution of the program stored in the memory 1020 enables the processor 1010 to perform processing steps on a terminal device side in the foregoing method embodiments, and enables the processor 1010 to control the transceiver 1030 to perform receiving and sending steps on the terminal device side in the foregoing method embodiments.

In another implementation, the communications apparatus 1000 is configured to perform an action performed by the network device in the foregoing method embodiments. In this case, the execution of the program stored in the memory 1020 enables the processor 1010 to perform processing steps on a network device side in the foregoing method embodiments, and enables the processor 1010 to control the transceiver 1030 to perform receiving and sending steps on the network device side in the foregoing method embodiments.

An embodiment of this application further provides a communications apparatus 1100. The communications apparatus 1100 may be a terminal device or a chip. The communications apparatus 1100 may be configured to perform an action performed by the terminal device in the foregoing method embodiments.

Figure 11:
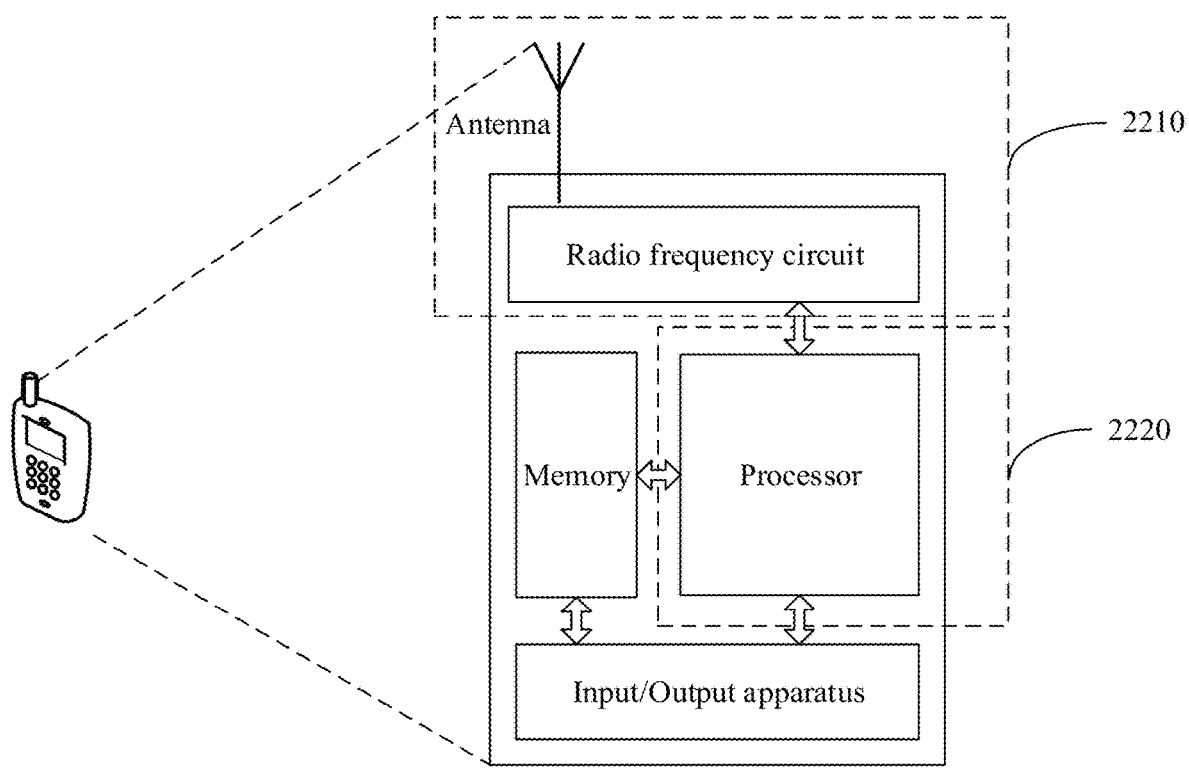
FIG. 11 is a schematic block diagram of a terminal device according to an embodiment of this application.

When the communications apparatus 1100 is a terminal device, FIG. 11 is a simplified schematic structural diagram of the terminal device. For ease of understanding and illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communications protocol and communications data, control the terminal device, execute a software program, process data of the software program, and so on. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave by using the antenna. When data is sent to the terminal device, the radio frequency circuit receives a radio frequency signal through the antenna, converts the radio frequency signal into a baseband signal, and outputs the baseband signal to the processor; and the processor converts the baseband signal into data, and processes the data. For ease of description, FIG. 11 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device.

As shown in FIG. 11, the terminal device includes a transceiver unit 2210 and a processing unit 2220. The transceiver unit 2210 may also be referred to as a transceiver, a transceiver machine, a transceiver apparatus, or the like. The processing unit 2220 may also be referred to as a processor, a processing board, a processing module, a processing apparatus, or the like. Optionally, a component that is in the transceiver unit 2210 and that is configured to implement a receiving function may be considered as a receiving unit, and a component that is in the transceiver unit 2210 and that is configured to implement a sending function may be considered as a sending unit. That is, the transceiver unit 2210 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the processing unit 2220 is configured to perform processing steps on a terminal device side in the embodiments of this application. The transceiver unit 2210 is further configured to perform step 310 and step 320 shown in FIG. 3 and step 420 shown in FIG. 4, and/or the transceiver unit 2210 is further configured to perform another sending/receiving step on a terminal device side.

It should be understood that FIG. 11 is merely an example instead of a limitation. The terminal device including the transceiver unit and the processing unit may not depend on the structure shown in FIG. 11.

When the communications device 1100 is a chip, the chip includes a transceiver unit and a processing unit. The transceiver unit may be an input/output circuit or a communications interface. The processing unit may be a processor, a microprocessor, or an integrated circuit integrated on the chip.

An embodiment of this application further provides a communications apparatus 1200. The communications apparatus 1200 may be a network device or a chip. The communications apparatus 1200 may be configured to perform an action performed by the network device in the foregoing method embodiments.

Figure 12:
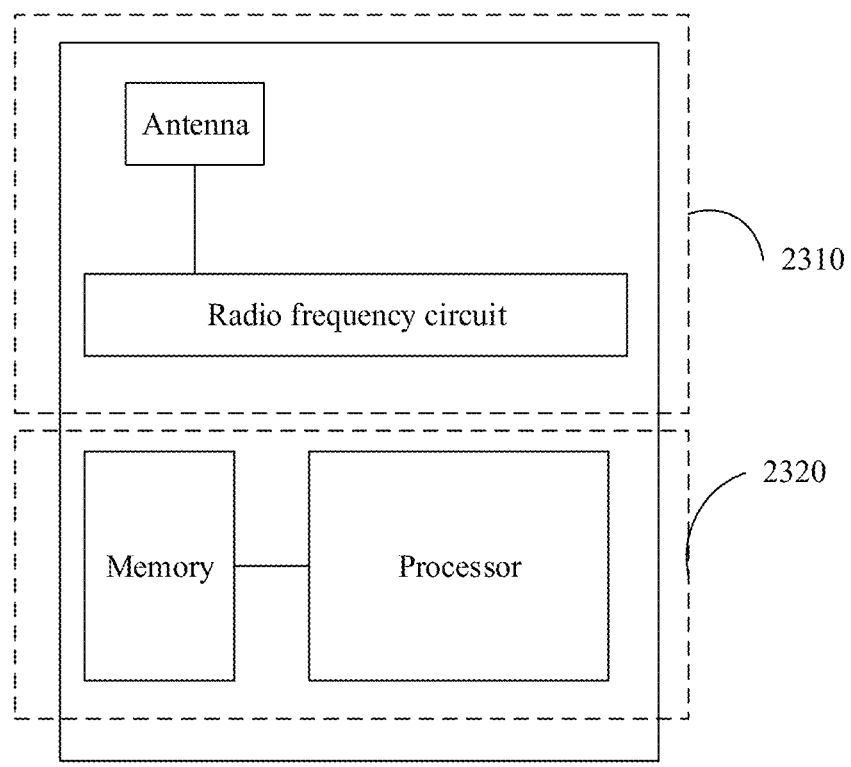
FIG. 12 is a schematic block diagram of a network device according to an embodiment of this application.

When the communications apparatus 1200 is a network device, for example, a base station, FIG. 12 is a simplified schematic structural diagram of the base station. The base station includes a part 2310 and a part 2220. The part 2310 is mainly configured to: send and receive a radio frequency signal, and perform conversion between the radio frequency signal and a baseband signal. The part 2320 is mainly configured to: perform baseband processing, control the base station, and so on. The part 2310 may be usually referred to as a transceiver unit, a transceiver machine, a transceiver circuit, a transceiver, or the like. The part 2320 is usually a control center of the base station, and may usually be referred to as a processing unit, and is configured to control the base station to perform a processing operation on a network device side in the foregoing method embodiments.

The transceiver unit in the part 2310 may also be referred to as a transceiver machine, a transceiver, or the like. The transceiver unit includes an antenna and a radio frequency unit. The radio frequency unit is mainly configured to perform radio frequency processing. Optionally, a component, in the part 2310, that is configured to implement a receiving function may be considered as a receiving unit, and a component that is configured to implement a sending function may be considered as a sending unit. That is, the part 2310 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 2320 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an implementation, the transceiver unit in the part 2310 is configured to perform the sending operation on the network device side in step 310 and step 320 shown in FIG. 3 and step 420 in FIG. 4, and/or the transceiver unit in the part 2310 is further configured to perform another sending/receiving step on the network device side in the embodiments of this application. The processing unit in the part 2320 is configured to perform a processing operation in step 410 in FIG. 4, and/or the processing unit in the part 2320 is further configured to perform a processing step on the network device side in the embodiments of this application.

It should be understood that FIG. 12 is merely an example instead of a limitation. The network device including the transceiver unit and the processing unit may not depend on the structure shown in FIG. 12.

When the communications apparatus 1200 is a chip, the chip includes a transceiver unit and a processing unit. The transceiver unit may be an input/output circuit or a communications interface. The processing unit is a processor, a microprocessor, or an integrated circuit integrated on the chip.

In addition, the network device is not limited to the foregoing forms, and may also be in another form. For example, the network device includes a BBU and an adaptive radio unit (adaptive radio unit, ARU), or includes a BBU and an active antenna unit (active antenna unit, AAU), or may be customer premises equipment (customer premises equipment, CPE), or may be in another form. This is not limited in this application.

The BBU may be configured to perform an action that is implemented inside the network device and that is described in the foregoing method embodiments, and the RRU may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor may be configured to perform the methods described in the method embodiments.

It should be understood that the processing apparatus may be a chip. For example, the processing apparatus may be a field programmable gate array (field programmable gate array, FPGA), an application-specific integrated chip (application specific integrated circuit, ASIC), a system on chip (system on chip, SoC), a central processing unit (central processor unit, CPU), a network processor (network processor, NP), a digital signal processing circuit (digital signal processor, DSP), a micro controller unit (micro controller unit, MCU), a programmable controller (programmable logic device, PLD), or another integrated chip.

In an implementation process, the steps in the foregoing methods may be completed by using a hardware integrated logic circuit in the processor or instructions in a form of software. The steps in the methods disclosed with reference to the embodiments of this application may be directly performed and completed by a hardware processor, or may be performed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor. To avoid repetition, details are not described herein.

It should be noted that the processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, any conventional processor, or the like. The steps in the methods disclosed with reference to the embodiments of this application may be directly performed and completed by a hardware decoding processor, or may be performed and completed by a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with hardware of the processor.

It may be understood that the memory in the embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Examples but not limitative description is provided herein. Many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these types of memories and any memory of another proper type.

According to the methods provided in the embodiments of this application, this application further provides a computer program product. The computer program product includes computer program code. When the computer program code is run on a computer, the computer is enabled to perform the method in any one of the embodiments shown in FIG. 3 to FIG. 8.

According to the methods provided in the embodiments of this application, this application further provides a computer-readable medium. The computer-readable medium stores program code. When the program code is run on a computer, the computer is enabled to perform the method in any one of the embodiments shown in FIG. 3 to FIG. 8.

According to the methods provided in the embodiments of this application, this application further provides a system. The system includes the foregoing one or more terminal devices and the foregoing one or more network devices.

All or some of the foregoing embodiments may be implemented by software, hardware, firmware, or any combination thereof. When software is used for implementation, all or some of the embodiments may be implemented in a form of computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disc, SSD)), or the like.

The network device and the terminal device in the foregoing apparatus embodiments correspond to the network device and the terminal device in the method embodiments. A corresponding module or unit performs a corresponding step. For example, a communications unit (a transceiver) performs a receiving step or a sending step in the method embodiments, and another step other than the sending step and the receiving step may be performed by a processing unit (a processor). For a function of a specific unit, refer to the corresponding method embodiments. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed by various computer-readable media that store various data structures. For example, the components may communicate by using a local and/or remote process based on a signal having one or more data packets (for example, data from two components interacting with another component in a local system, a distributed system, and/or across a network such as the internet interacting with another system by using the signal).

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the division of units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving downlink control information (DCI), wherein the DCI indicates N demodulation reference signal (DMRS) ports, the N DMRS ports correspond to each of M physical downlink shared channel (PDSCH), the N DMRS ports used in at least two of M PDSCH transmission units correspond to different transmission configuration indicator (TCI)-states, N is an integer greater than or equal to 1, and M is an integer greater than or equal to 2, and wherein at least one PDSCH transmission unit among the M PDSCH transmission units is determined based on an interval between neighboring PDSCH transmission units, and the interval between the neighboring PDSCH transmission units comprises a symbol length between an ending position of a first PDSCH transmission unit and a starting position of a second PDSCH transmission unit in the neighboring PDSCH transmission units; and
receiving M PDSCHs based on the DCI.

2. The communication method according to claim 1, wherein:
the M PDSCHs comprise a first PDSCH;
a PDSCH transmission unit configured to transmit the first PDSCH is a first PDSCH transmission unit; and
the first PDSCH transmission unit is determined based on a starting position of the first PDSCH transmission unit and a length of the first PDSCH transmission unit.

3. The communication method according to claim 2, wherein:
the M PDSCHs further comprise a second PDSCH; and
a PDSCH transmission unit configured to transmit the second PDSCH is a second PDSCH transmission unit; and
the second PDSCH transmission unit is determined based on the first PDSCH transmission unit and an interval between the first PDSCH transmission unit and the second PDSCH transmission unit.

4. The communication method according to claim 1, wherein:
the interval between the neighboring PDSCH transmission units is carried in higher layer signaling; or
when the higher layer signaling does not carry the interval between the neighboring PDSCH transmission units, the interval between the neighboring PDSCH transmission units is 0.

5. A communications apparatus, comprising:
at least one processor configured with processor-executable instructions to perform operations comprising:
receiving downlink control information (DCI), wherein the DCI indicates N demodulation reference signal (DMRS) ports, the N DMRS ports correspond to each of M physical downlink shared channel (PDSCH), the N DMRS ports used in at least two of M PDSCH transmission units correspond to different transmission configuration indicator (TCI)-states, N is an integer greater than or equal to 1, and M is an integer greater than or equal to 2, and wherein at least one PDSCH transmission unit among the M PDSCH transmission units is determined based on an interval between neighboring PDSCH transmission units, and the interval between the neighboring PDSCH transmission units comprises a symbol length between an ending position of a first PDSCH transmission unit and a starting position of a second PDSCH transmission unit in the neighboring PDSCH transmission units; and
receiving M PDSCHs based on the DCI.

6. The communications apparatus according to claim 5, wherein:
the M PDSCHs comprise a first PDSCH;
a PDSCH transmission unit configured to transmit the first PDSCH is a first PDSCH transmission unit; and
the first PDSCH transmission unit is determined based on a starting position of the first PDSCH transmission unit and a length of the first PDSCH transmission unit.

7. The communications apparatus according to claim 6, wherein:
the M PDSCHs further comprise a second PDSCH;
a PDSCH transmission unit configured to transmit the second PDSCH is a second PDSCH transmission unit; and
the second PDSCH transmission unit is determined based on the first PDSCH transmission unit and an interval between the first PDSCH transmission unit and the second PDSCH transmission unit.

8. The communications apparatus according to claim 5, wherein:
the interval between the neighboring PDSCH transmission units is carried in higher layer signaling; or
when the higher layer signaling does not carry the interval between the neighboring PDSCH transmission units, the interval between the neighboring PDSCH transmission units is 0.

9. The communications apparatus according to claim 5, wherein:
the communications apparatus is any one of the following: a terminal device, a chip, or a chip system.

10. A non-transitory computer-readable storage medium, comprising a computer program for execution by at least one processor to perform operations comprising:
receiving downlink control information (DCI), wherein the DCI indicates N demodulation reference signal (DMRS) ports, the N DMRS ports correspond to each of M physical downlink shared channel (PDSCH), the N DMRS ports used in at least two of M PDSCH transmission units correspond to different transmission configuration indicator (TCI)-states, N is an integer greater than or equal to 1, and M is an integer greater than or equal to 2, and wherein at least one PDSCH transmission unit among the M PDSCH transmission units is determined based on an interval between neighboring PDSCH transmission units, and the interval between the neighboring PDSCH transmission units comprises a symbol length between an ending position of a first PDSCH transmission unit and a starting position of a second PDSCH transmission unit in the neighboring PDSCH transmission units; and receiving M PDSCHs based on the DCI.

11. The non-transitory computer-readable storage medium according to claim 10, wherein:
the M PDSCHs comprise a first PDSCH;
a PDSCH transmission unit configured to transmit the first PDSCH is a first PDSCH transmission unit; and
the first PDSCH transmission unit is determined based on a starting position of the first PDSCH transmission unit and a length of the first PDSCH transmission unit.

12. The non-transitory computer-readable storage medium according to claim 11, wherein:
the M PDSCHs further comprise a second PDSCH;
a PDSCH transmission unit configured to transmit the second PDSCH is a second PDSCH transmission unit; and
the second PDSCH transmission unit is determined based on the first PDSCH transmission unit and an interval between the first PDSCH transmission unit and the second PDSCH transmission unit.

13. The non-transitory computer-readable storage medium according to claim 10, wherein:
the interval between the neighboring PDSCH transmission units is carried in higher layer signaling; or
when the higher layer signaling does not carry the interval between the neighboring PDSCH transmission units, the interval between the neighboring PDSCH transmission units is 0.

14. A communication method, comprising:
generating downlink control information (DCI), wherein the DCI indicates N demodulation reference signal (DMRS) ports, the N DMRS ports correspond to each of M physical downlink shared channel (PDSCH), the N DMRS ports used in at least two of M PDSCH transmission units correspond to different transmission configuration indicator (TCI)-states, N is an integer greater than or equal to 1, and M is an integer greater than or equal to 2, and wherein at least one PDSCH transmission unit among the M PDSCH transmission units is determined based on an interval between neighboring PDSCH transmission units, and the interval between the neighboring PDSCH transmission units comprises a symbol length between an ending position of a first PDSCH transmission unit and a starting position of a second PDSCH transmission unit in the neighboring PDSCH transmission units; and
sending the DCI.

15. The communication method according to claim 14, wherein:
the M PDSCHs comprise a first PDSCH;
a PDSCH transmission unit configured to transmit the first PDSCH is a first PDSCH transmission unit; and
the first PDSCH transmission unit is determined based on a starting position of the first PDSCH transmission unit and a length of the first PDSCH transmission unit.

16. The communication method according to claim 15, wherein:
the M PDSCHs further comprise a second PDSCH; and
a PDSCH transmission unit configured to transmit the second PDSCH is a second PDSCH transmission unit; and
the second PDSCH transmission unit is determined based on the first PDSCH transmission unit and an interval between the first PDSCH transmission unit and the second PDSCH transmission unit.

17. The communication method according to claim 14, wherein:
the interval between the neighboring PDSCH transmission units is carried in higher layer signaling; or when the higher layer signaling does not carry the interval between the neighboring PDSCH transmission units, the interval between the neighboring PDSCH transmission units is 0.

18. A communications apparatus, comprising:
at least one processor configured with processor-executable instructions to perform operations comprising:
generating downlink control information (DCI), wherein the DCI indicates N demodulation reference signal (DMRS) ports, the N DMRS ports correspond to each of M physical downlink shared channel (PDSCH), the N DMRS ports used in at least two of M PDSCH transmission units correspond to different transmission configuration indicator (TCI)-states, N is an integer greater than or equal to 1, and M is an integer greater than or equal to 2, and wherein at least one PDSCH transmission unit among the M PDSCH transmission units is determined based on an interval between neighboring PDSCH transmission units, and the interval between the neighboring PDSCH transmission units comprises a symbol length between an ending position of a first PDSCH transmission unit and a starting position of a second PDSCH transmission unit in the neighboring PDSCH transmission units; and
sending the DCI.

19. The communications apparatus according to claim 18, wherein:
the M PDSCHs comprise a first PDSCH;
a PDSCH transmission unit configured to transmit the first PDSCH is a first PDSCH transmission unit; and
the first PDSCH transmission unit is determined based on a starting position of the first PDSCH transmission unit and a length of the first PDSCH transmission unit.

20. The communications apparatus according to claim 18, wherein:
the M PDSCHs further comprise a second PDSCH; and
a PDSCH transmission unit configured to transmit the second PDSCH is a second PDSCH transmission unit; and
the second PDSCH transmission unit is determined based on the first PDSCH transmission unit and an interval between the first PDSCH transmission unit and the second PDSCH transmission unit.

21. The communications apparatus according to claim 18, wherein:
the interval between the neighboring PDSCH transmission units is carried in higher layer signaling; or
when the higher layer signaling does not carry the interval between the neighboring PDSCH transmission units, the interval between the neighboring PDSCH transmission units is 0.

* * * * *